(12) United States Patent
Guan

(10) Patent No.: US 10,700,842 B2
(45) Date of Patent: Jun. 30, 2020

(54) FEEDBACK INFORMATION SENDING METHOD, FEEDBACK INFORMATION RECEIVING METHOD, TERMINAL DEVICE, AND ACCESS NETWORK DEVICE

(71) Applicant: Huawei Technologies Co., Ltd., Shenzhen (CN)

(72) Inventor: Lei Guan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/148,539

(22) Filed: Oct. 1, 2018

(65) Prior Publication Data

US 2019/0036668 A1    Jan. 31, 2019

Related U.S. Application Data

(63) Continuation of application No. PCT/CN2016/078361, filed on Apr. 1, 2016.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04L 1/1854* (2013.01);
(Continued)

(58) Field of Classification Search
CPC ... H04L 1/1812; H04L 1/1854; H04L 1/1887; H04L 1/1896; H04L 5/0055; H04L 5/0082; H04L 72/0446; H04L 72/1284
See application file for complete search history.

(56) References Cited

U.S. PATENT DOCUMENTS

2007/0060146 A1* 3/2007 Won ..................... H04L 1/1867
455/445
2009/0092085 A1    4/2009 Ramesh et al.
(Continued)

FOREIGN PATENT DOCUMENTS

CN    101237279 A    8/2008
CN    101237312 A    8/2008
(Continued)

OTHER PUBLICATIONS

CN/2016800830688, Search Report, dated Nov. 18, 2019.

*Primary Examiner* — Mewale A Ambaye
(74) *Attorney, Agent, or Firm* — Leydig, Voit & Mayer, Ltd.

(57) ABSTRACT

Embodiments of the present invention relate to the field of communications technologies, and provide a feedback information sending method, a terminal device, and an access network device, so as to send feedback information on an unlicensed spectrum. According to the embodiments of the present invention, the terminal device receives, in a downlink subframe in a downlink subframe set, downlink data, and then determines, in at least one uplink burst, a sending subframe used for sending feedback information corresponding to the downlink data, where the downlink subframe set is a subset of a set consisting of a downlink subframe associated with the sending subframe, and each of the at least one uplink burst includes at least one uplink subframe; and then sends, in the sending subframe, the feedback information. The solutions provided in the embodiments of the present invention are used when the feedback information is sent.

13 Claims, 9 Drawing Sheets

(51) Int. Cl.
*H04W 72/04* (2009.01)
*H04W 72/12* (2009.01)

(52) U.S. Cl.
CPC .......... *H04L 1/1887* (2013.01); *H04L 5/0082* (2013.01); *H04W 72/0446* (2013.01); *H04W 72/1284* (2013.01); *H04L 1/1896* (2013.01)

(56) References Cited

U.S. PATENT DOCUMENTS

| | | | |
|---|---|---|---|
| 2009/0181689 A1* | 7/2009 | Lee | H04L 1/1854 455/450 |
| 2011/0107170 A1* | 5/2011 | Park | H04L 1/1854 714/749 |
| 2012/0230216 A1 | 9/2012 | Park et al. | |
| 2014/0003387 A1* | 1/2014 | Lee | H04L 5/001 370/330 |
| 2014/0044092 A1* | 2/2014 | Guan | H04W 72/0413 370/330 |
| 2015/0208408 A1 | 7/2015 | Berggren et al. | |
| 2015/0236836 A1 | 8/2015 | Seo et al. | |
| 2016/0086613 A1 | 3/2016 | Li et al. | |
| 2016/0128089 A1* | 5/2016 | Seo | H04L 5/00 370/329 |

FOREIGN PATENT DOCUMENTS

| | | |
|---|---|---|
| CN | 104396296 A | 3/2015 |
| CN | 104541471 A | 4/2015 |
| EP | 2681865 B1 | 7/2018 |

\* cited by examiner

FEEDBACK INFORMATION SENDING METHOD, FEEDBACK INFORMATION RECEIVING METHOD, TERMINAL DEVICE, AND ACCESS NETWORK DEVICE

CROSS REFERENCES TO RELATED APPLICATIONS

This application is a continuation of International Application No. PCT/CN2016/078361, filed Apr. 1, 2016, the disclosure of which is hereby incorporated by reference in its entirety.

TECHNICAL FIELD

Embodiments of the present invention relate to the field of communications technologies, and in particular, to a feedback information sending method, a feedback information receiving method, a terminal device, and an access network device.

BACKGROUND

A Long Term Evolution (LTE) system is based on an orthogonal frequency division multiple access (OFDMA) technology. A time-frequency resource is divided into OFDM symbols in a time domain dimension and OFDM subcarriers in a frequency domain dimension. The smallest resource granularity is called a resource element (RE), which represents a time-frequency grid point of an OFDM symbol in the time domain and an OFDM subcarrier in the frequency domain. Service transmission in the LTE system is scheduled based on a base station. A basic time unit of scheduling is one subframe, and its typical duration is 1 millisecond. A subframe with a normal cyclic prefix includes 14 OFDM symbols, and a subframe with an extended cyclic prefix includes 12 OFDM symbols. A shorter subframe may be used in a continuously evolved LTE system or another wireless system in the future. For example, a duration of a future subframe may be equivalent to duration of one current OFDM symbol.

A specific scheduling process in the LTE system is that the base station sends a control channel. The control channel may carry scheduling information of a data channel. The control channel may be a physical downlink control channel (PDCCH) or an enhanced physical downlink control channel (EPDCCH). The data channel may be a physical downlink shared channel (PDSCH) or a physical uplink shared channel (PUSCH). The scheduling information includes control information such as resource allocation information or a modulation and coding scheme. After a User Equipment (UE) and the base station are synchronized, the UE detects the control channel in a subframe based on a subframe boundary, and receives a downlink data channel or sends an uplink data channel based on the scheduling information carried in the detected control channel. LTE further supports a carrier aggregation technology, that is, the base station configures a plurality of carriers for one UE to improve a data rate of the UE. During carrier aggregation, the plurality of carriers sent on a base station side are synchronously sent, that is, subframe boundaries of the plurality of carriers are aligned. The UE may separately receive a PDCCH and a corresponding PDSCH on each carrier. A detection process of each carrier is similar to the foregoing single carrier case. It should be noted that a carrier concept is equivalent to a serving cell concept in the LTE system. For example, accessing a carrier by the UE is equivalent to accessing a serving cell. The serving cell concept is used for description below.

A hybrid automatic repeat request (HARM) mechanism is used in the LTE system. Specifically, downlink data transmission is used as an example. The UE decodes a received PDSCH sent by a base station. If decoding is correct, for example, a cyclic redundancy check (CRC) is passed, the UE feeds back acknowledgement (ACK) information to the base station. If decoding is incorrect, for example, the CRC is not passed, the UE feeds back negative acknowledgement (NACK) information to the base station. Currently, in LTE, a subframe interval between receiving a subframe of the PDSCH by the UE and feeding back a subframe of an ACK or a NACK corresponding to the PDSCH by the UE is predefined, so as to ensure feeding back to the ACK or the NACK by the UE and receiving the ACK or the NACK by the base station.

All spectrums on which the serving cell of the current LTE system is deployed are licensed spectrums. A licensed spectrum can be used only by an operator network that purchases the licensed spectrum. More attention is paid to an unlicensed spectrum, because the unlicensed spectrum can be used by any operator. Therefore, a specific rule needs to be met to allow for coexistence of different operators. Spectrum resources will become increasingly in short supply in the future, and consequently a service capability of the LTE system based on the licensed spectrum is limited. In addition, Wi-Fi can use a large quantity of unlicensed spectrums to improve the service capability, and this brings a great competition and challenge to LTE. Therefore, using unlicensed spectrum in an LTE system is an evolution direction. An LTE system deployed on the unlicensed spectrum is called an unlicensed Long Term Evolution (U-LTE) system. Currently, a mainstream technology for U-LTE system deployment is using an U-LTE serving cell deployed on the unlicensed spectrum as a secondary serving cell and performing carrier aggregation on the secondary serving cell and a primary serving cell that is deployed on the licensed spectrum to serve the UE. In the future, the U-LTE serving cell may independently serve the UE, that is, the serving cell on the licensed spectrum is not required to provide assistance.

Considering friendly multi-system coexistence on the unlicensed spectrum, such as coexistence between the U-LTE system and a Wi-Fi system or coexistence between U-LTE systems of a plurality of operators, limitation of some coexistence rules needs to be followed when the unlicensed spectrum is used, such as a listen before talk (LBT) rule. Specifically, before sending a signal on a channel in which the U-LTE serving cell is located, the base station or the UE needs to perform clear channel assessment (CCA) on the channel in which the serving cell is located. Once it is detected that a receive power exceeds a threshold, the base station or the UE temporarily cannot send the signal on the channel. The base station or the UE can send the signal on the channel only when discovering that the channel is idle. Even in some cases, the base station or the UE needs to perform random backoff, and can send the signal on the channel only when the channel is idle during the random backoff.

In addition, several fixed TDD uplink-downlink configurations in current LTE are not used, but a flexible uplink-downlink configuration is used in the U-LTE serving cell. In this case, U-LTE cannot use a fixed uplink ACK or NACK feedback timing relationship at an interval of four subframes of FDD nor a fixed uplink ACK or NACK feedback timing relationship of each current TDD uplink-downlink configuration.

In conclusion, how to transmit an uplink ACK or NACK on a U-LTE serving cell on an unlicensed spectrum is an urgent problem to be resolved in the present invention.

SUMMARY

Embodiments of the present invention provide a feedback information sending method, a feedback information receiving method, a terminal device, and an access network device, so as to send feedback information on an unlicensed spectrum.

According to a first aspect, an embodiment of the present invention provides a feedback information sending method, including:

receiving, by a terminal device in a downlink subframe in a downlink subframe set of a downlink burst, downlink data sent by an access network device;

determining, by the terminal device in at least one uplink burst, a sending subframe used for sending feedback information corresponding to the downlink data, where the downlink subframe set is a subset of a set consisting of a downlink subframe associated with the sending subframe, the at least one uplink burst follows the downlink burst, and each of the at least one uplink burst includes at least one uplink subframe; and sending, by the terminal device in the sending subframe, the feedback information to the access network device.

With reference to the first aspect, in a first possible implementation, the method includes:

determining, by the terminal device in the at least one uplink burst, a candidate sending subframe set, where the candidate sending subframe set includes at least one candidate sending subframe; and determining, by the terminal device, the sending subframe from the candidate sending subframe set.

Optionally, the method further includes: determining, by the terminal device in the at least one uplink burst, the candidate sending subframe set according to a signaling of the access network device.

Optionally, the signaling is common downlink control signaling, and the terminal device receives the common downlink control signaling in the penultimate and/or the last downlink subframe of the downlink burst.

Optionally, the terminal device determines the sending subframe from the candidate sending subframe set based on a hybrid automatic repeat request (HARQ) timing relationship.

Optionally, before the sending, by the terminal device in the sending subframe, the feedback information to the access network device, the method further includes:

separately receiving, by the terminal device in each of at least one downlink subframe in the downlink subframe set, an index indication sent by the access network device, where a value of the index indication is determined based on any one of the following information:

a first subframe number, in the downlink burst, of a downlink subframe in which the index indication is located;

a first subframe number, in the downlink burst, that is started from a first start scheduling subframe and that is of a downlink subframe in which the index indication is located, where the first start scheduling subframe is a first subframe, of the terminal device, scheduled by the access network device in the downlink burst;

a second subframe number, in the downlink subframe set, of a downlink subframe in which the index indication is located; and a second subframe number, in the downlink subframe set, that is started from a second start scheduling subframe and that is of a downlink subframe in which the index indication is located, where the second start scheduling subframe is a first subframe, of the terminal device, scheduled by the access network device in the downlink subframe set.

Optionally, the method further includes:

generating, by the terminal device, a codebook of the feedback information, where original bits of feedback information separately corresponding to at least one first downlink subframe and/or at least one second downlink subframe in the downlink subframe set are sorted in the codebook based on the value of the index indication, and the first downlink subframe and the second downlink subframe are respectively, in the downlink subframe set, a downlink subframe in which the terminal device receives the downlink data and a downlink subframe in which the terminal device does not receive the downlink data; and performing, by the terminal device, channel encoding on the feedback information based on the codebook; and the sending, by the terminal device in the sending subframe, the feedback information to the access network device includes:

sending, by the terminal device in the sending subframe, the channel-encoded feedback information to the access network device.

Optionally, the terminal device generates the codebook of the feedback information according to the index indication and the common downlink control signaling, and the common downlink control signaling is signaling received by the terminal device from the access network device in the penultimate and/or the last downlink subframe of the downlink burst.

According to a second aspect, an embodiment of the present invention provides a feedback information receiving method, including:

sending, by an access network device in a downlink subframe in a downlink subframe set of a downlink burst, downlink data to a terminal device;

determining, by the access network device in at least one uplink burst, a receiving subframe used for receiving feedback information corresponding to the downlink data, where the downlink subframe set is a subset of a set consisting of a downlink subframe associated with the receiving subframe, the at least one uplink burst follows the downlink burst, and each of the at least one uplink burst includes at least one uplink subframe; and receiving, by the access network device in the receiving subframe, the feedback information.

With reference to the second aspect, in a first possible implementation, the method includes:

determining, by the access network device in the at least one uplink burst, a candidate receiving subframe set, where the candidate receiving subframe set includes at least one candidate receiving subframe; and determining, by the access network device, the receiving subframe from the candidate receiving subframe set.

Optionally, the method further includes: notifying, by the access network device by sending signaling, the terminal device of the candidate receiving subframe set.

Optionally, the signaling is common downlink control signaling, and the access network device sends the common downlink control signaling in the penultimate and/or the last downlink subframe of the downlink burst.

Optionally, the access network device determines the receiving subframe from the candidate receiving subframe set based on a hybrid automatic repeat request (HARQ) timing relationship.

Optionally, before the receiving, by the access network device in the receiving subframe, the feedback information, the method further includes:

separately sending, by the access network device, an index indication to the terminal device in each of at least one downlink subframe, in the downlink subframe set, that actually schedules the terminal device to transmit the downlink data, where a value of the index indication is determined based on any one of the following information:

a first subframe number, in the downlink burst, of a downlink subframe in which the index indication is located;

a first subframe number, in the downlink burst, that is started from a first start scheduling subframe and that is of a downlink subframe in which the index indication is located, where the first start scheduling subframe is a first subframe, of the terminal device, scheduled by the access network device in the downlink burst;

a second subframe number, in the downlink subframe set, of a downlink subframe in which the index indication is located; and a second subframe number, in the downlink subframe set, that is started from a second start scheduling subframe and that is of a downlink subframe in which the index indication is located, where the second start scheduling subframe is a first subframe, of the terminal device, scheduled by the access network device in the downlink subframe set.

Optionally, after the receiving, by the access network device in the receiving subframe, the feedback information, the method further includes:

determining, by the access network device, a size of a codebook of the feedback information;

performing, by the access network device, channel decoding on the received feedback information based on the size of the codebook of the feedback information; and parsing, by the access network device, the codebook of the channel decoded feedback information, where original bits of feedback information separately corresponding to at least one first downlink subframe and/or at least one second downlink subframe in the downlink subframe set are sorted in the codebook based on the value of the index indication, and the first downlink subframe and the second downlink subframe are respectively, in the downlink subframe set, a downlink subframe in which the terminal device transmits the downlink data and is scheduled by the access network device and a downlink subframe in which the terminal device transmits the downlink data and is not scheduled by the access network device.

Optionally, the index indication and the common downlink control signaling are used to indicate the codebook of the feedback information to the terminal device, and the common downlink control signaling is signaling sent by the access network device in the penultimate and/or the last downlink subframe of the downlink burst.

According to a third aspect, an embodiment of the present invention provides a terminal device. The terminal device includes:

a receiving unit, configured to receive in a downlink subframe in a downlink subframe set of a downlink burst, downlink data sent by an access network device;

a determining unit, configured to determine in at least one uplink burst, a sending subframe used for sending feedback information corresponding to the downlink data received by the receiving unit, where the downlink subframe set is a subset of a set consisting of a downlink subframe associated with the sending subframe, the at least one uplink burst follows the downlink burst, and each of the at least one uplink burst includes at least one uplink subframe; and a sending unit, configured to send in the sending subframe determined by the determining unit, the feedback information to the access network device.

Optionally, the determining unit is configured to determine in the at least one uplink burst, a candidate sending subframe set, where the candidate sending subframe set includes at least one candidate sending subframe; and the determining unit is configured to determine the sending subframe from the candidate sending subframe set determined by the determining unit.

Optionally, the determining unit is configured to determine, by the terminal device in the at least one uplink burst, the candidate sending subframe set according to a signaling of the access network device.

Optionally, the signaling is common downlink control signaling, and the receiving unit is configured to receive the common downlink control signaling in the penultimate and/or the last downlink subframe of the downlink burst.

Optionally, the determining unit is configured to determine based on a hybrid automatic repeat request (HARQ) timing relationship, the sending subframe from the candidate sending subframe set determined by the determining unit.

Optionally, before the sending in the sending subframe, the feedback information to the access network device:

the receiving unit is further configured to separately receive in each of at least one downlink subframe in the downlink subframe set, an index indication sent by the access network device, where a value of the index indication is determined based on any one of the following information:

a first subframe number, in the downlink burst, of a downlink subframe in which the index indication is located;

a first subframe number, in the downlink burst, that is started from a first start scheduling subframe and that is of a downlink subframe in which the index indication is located, where the first start scheduling subframe is a first subframe, of the terminal device, scheduled by the access network device in the downlink burst;

a second subframe number, in the downlink subframe set, of a downlink subframe in which the index indication is located; and a second subframe number, in the downlink subframe set, that is started from a second start scheduling subframe and that is of a downlink subframe in which the index indication is located, where the second start scheduling subframe is a first subframe, of the terminal device, scheduled by the access network device in the downlink subframe set.

Optionally, the terminal device further includes:

an encoding unit, configured to generate a codebook of the feedback information, where original bits of feedback information separately corresponding to at least one first downlink subframe and/or at least one second downlink subframe in the downlink subframe set are sorted in the codebook based on the value of the index indication, and the first downlink subframe and the second downlink subframe are respectively, in the downlink subframe set, a downlink subframe in which the terminal device receives the downlink data and a downlink subframe in which the terminal device does not receive the downlink data, where the encoding unit is configured to perform channel encoding on the feedback information based on the codebook generated by the encoding unit; and the sending in the sending subframe, the feedback information to the access network device includes:

the sending unit is configured to send to the access network device in the sending subframe, the feedback information obtained after the encoding unit performs channel encoding.

Optionally, the encoding unit is configured to generate the codebook of the feedback information according to the index indication and the common downlink control signaling, and the common downlink control signaling is signaling received from the access network device in the penultimate and/or the last downlink subframe of the downlink burst.

According to a fourth aspect, an embodiment of the present invention provides an access network device. The access network device includes:

a sending unit, configured to send in a downlink subframe in a downlink subframe set of a downlink burst, downlink data to a terminal device;

a determining unit, configured to determine in at least one uplink burst, a receiving subframe used for receiving feedback information corresponding to the downlink data sent by the sending unit, where the downlink subframe set is a subset of a set consisting of a downlink subframe associated with the receiving subframe, the at least one uplink burst follows the downlink burst, and each of the at least one uplink burst includes at least one uplink subframe; and a receiving unit, configured to receive in the receiving subframe determined by the determining unit, the feedback information.

Optionally, the determining unit is configured to determine in the at least one uplink burst, a candidate receiving subframe set, where the candidate receiving subframe set includes at least one candidate receiving subframe; and the determining unit is further configured to determine the receiving subframe from the candidate receiving subframe set determined by the determining unit.

Optionally, the sending unit is configured to notify by sending signaling, the terminal device of the candidate receiving subframe set determined by the determining unit.

Optionally, the signaling is common downlink control signaling, and the sending unit is configured to send the common downlink control signaling in the penultimate and/or the last downlink subframe of the downlink burst.

Optionally, the determining unit is configured to determine based on a hybrid automatic repeat request (HARQ) timing relationship, the receiving subframe from the candidate receiving subframe set determined by the determining unit.

Optionally, before the receiving in the receiving subframe, the feedback information:

the sending unit is configured to separately send an index indication to the terminal device in each of at least one downlink subframe, in the downlink subframe set, that actually schedules the terminal device to transmit the downlink data, where a value of the index indication is determined based on any one of the following information:

a first subframe number, in the downlink burst, of a downlink subframe in which the index indication is located;

a first subframe number, in the downlink burst, that is started from a first start scheduling subframe and that is of a downlink subframe in which the index indication is located, where the first start scheduling subframe is a first subframe, of the terminal device, scheduled in the downlink burst;

a second subframe number, in the downlink subframe set, of a downlink subframe in which the index indication is located; and a second subframe number, in the downlink subframe set, that is started from a second start scheduling subframe and that is of a downlink subframe in which the index indication is located, where the second start scheduling subframe is a first subframe, of the terminal device, scheduled in the downlink subframe set.

Optionally, the determining unit is further configured to determine a size of a codebook of the feedback information after the feedback information is received in the receiving subframe.

A decoding unit is configured to perform channel decoding on the received feedback information based on the size of the codebook of the feedback information; and a parsing unit is configured to parse the codebook of the channel decoded feedback information, where original bits of feedback information separately corresponding to at least one first downlink subframe and/or at least one second downlink subframe in the downlink subframe set are sorted in the codebook based on the value of the index indication, and the first downlink subframe and the second downlink subframe are respectively, in the downlink subframe set, a downlink subframe in which the terminal device transmits the downlink data and is scheduled and a downlink subframe in which the terminal device transmits the downlink data and is not scheduled.

Optionally, the index indication and the common downlink control signaling are used to indicate the codebook of the feedback information to the terminal device, and the common downlink control signaling is signaling sent in the penultimate and/or the last downlink subframe of the downlink burst.

According to the feedback information sending method, the feedback information receiving method, the terminal device, and the access network device provided in the embodiments of the present invention, the terminal device receives, in the downlink subframe in the downlink subframe set of the downlink burst, the downlink data sent by the access network device, and then the terminal device determines, in the at least one uplink burst, the sending subframe used for sending the feedback information corresponding to the downlink data, where the downlink subframe set is the subset of the set consisting of the downlink subframe associated with the sending subframe, the at least one uplink burst follows the downlink burst, and each of the at least one uplink burst includes the at least one uplink subframe; and the terminal device sends, in the sending subframe, the feedback information to the access network device. The solutions provided in the embodiments of the present invention are used when the feedback information is sent, so as to send the feedback information on the unlicensed spectrum.

DESCRIPTION OF EMBODIMENTS

Figure 1:
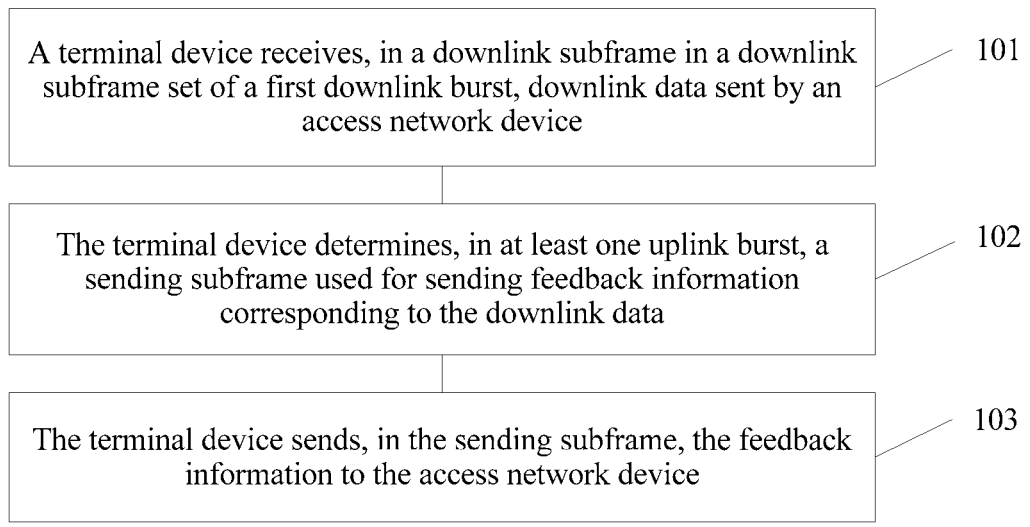
FIG. 1 is a flowchart of a feedback information sending method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Although an LTE system is used as an example for description in the foregoing background part, a person skilled in the art should know that the present invention is not only applicable to the LTE system, but also applicable to other wireless communications systems, such as a Global System for Mobile Communications (GSM), a Universal Mobile Telecommunications System (UMTS), a Code Division Multiple Access (CDMA) system, and a new network system. The following describes specific embodiments by using the LTE system as an example.

A terminal device used in the embodiments of the present invention may refer to a device that provides a user with voice and/or data connectivity, a handheld device with a radio connection function, or another processing device connected to a wireless modem. A wireless terminal may communicate with one or more core networks through a radio access network (RAN). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL,) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or user equipment.

The access network device used in the embodiments of the present invention may be a base station or an access point, or may refer to a device that communicates with a wireless terminal by using one or more sectors over an air interface in an access network. The base station may be configured to convert between a received over-the-air frame and an IP packet and serve as a router between the wireless terminal and a remaining part of the access network, where the remaining part of the access network may include an Internet Protocol (IP) network. The base station may further coordinate attribute management of the air interface. For example, the base station may be a base station (BTS) in GSM or the CDMA, may be a base station (NodeB) in WCDMA, or may be an evolved NodeB (eNB or e-NodeB, evolved NodeB) in the LTE, which is not limited in this application.

An LTE system supports two duplex manners: frequency division duplex (FDD) and time division duplex (TDD). For an FDD system, downlink data and uplink data are transmitted in different carriers. For a TDD system, uplink data and downlink data are transmitted at different times in a same carrier. A TDD carrier specifically includes a downlink subframe, an uplink subframe, and a special subframe. The special subframe includes three parts: a downlink pilot time slot (DwPTS), a guard period (GP), and an uplink pilot time slot (UpPTS). The GP is mainly used for compensation for a downlink-to-uplink device conversion time and a propagation delay. In addition, downlink data can be transmitted in the DwPTS, but uplink data cannot be transmitted in the UpPTS in the current LTE system. Therefore, the special subframe may be considered as a downlink subframe. LTE currently supports seven different TDD uplink-downlink configurations. As shown in Table 1, D represents a downlink subframe, S represents a special subframe, and U represents an uplink subframe.

TABLE 1

Different TDD uplink-downlink configurations in an LTE system

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

Different TDD uplink-downlink configurations in an LTE system

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

In the current LTE system, especially in an LTE system deployed on a licensed spectrum, feedback timing from a PDSCH to an ACK or a NACK is predefined. Specifically, for the FDD, after receiving information carried in the PDSCH in a subframe n−4, a terminal device feeds back the ACK or the NACK corresponding to the PDSCH in a subframe n. For the TDD, a time sequence relationship or a timing relationship between the PDSCH and the ACK or the NACK corresponding to the PDSCH is shown in Table 2. A subframe marked with a number is an uplink subframe n for feeding back the ACK or the NACK. The marking number represents that the uplink subframe n needs to feed back an ACK or a NACK corresponding to a PDSCH in a downlink subframe set of n−k (k is included in K). For example, K={7, 6} with a subframe number n=2 whose uplink-downlink configuration is 1 represents that an uplink subframe n=2 is used to feed back ACKs or NACKs corresponding to PDSCHs in two downlink subframes n−7 and n−6. Specifically, n−7 is a downlink subframe 5, and n−6 is a downlink subframe 6.

TABLE 2

Time sequence relationship between a PDSCH and an ACK or a NACK corresponding to the PDSCH in a TDD system

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

LTE further supports a CA technology. That is, a base station configures a plurality of carriers for the terminal device to improve a data transmission rate of the terminal device. When CA is performed, the base station synchronously sends the plurality of carriers. The terminal device may separately detect a PDCCH and a corresponding PDSCH that schedule each carrier. A specific detection process of each carrier is similar to the foregoing single carrier case, and details are not described herein again. The LTE system supports FDD CA, TDD CA, and FDD+TDD CA. The TDD CA is further classified into TDD CA with a same uplink-downlink configuration and TDD CA with different uplink-downlink configurations. It should be noted that in CA mode, there are one primary component carrier and at least one secondary component carrier. A PUCCH that carries the ACK or the NACK may be configured on a primary component carrier of the terminal device, or the PUCCH may be configured on both the primary component carrier and one secondary component carrier.

There are a plurality of PUCCH sending modes in a single carrier mode or in the CA mode, such as a binding mode, a channel selection mode, and a codebook multiplexing mode. The codebook multiplexing mode is relatively frequently used. The codebook multiplexing mode is illustrated by using an example of a TDD uplink-downlink configuration 2 that is widely deployed in a current network. An uplink subframe 2 of one carrier can support feedback of four ACK or NACK bits. CA of a TDD uplink-downlink configuration 2 of five carriers can support feedback of 20 ACK or NACK bits. In this case, it may be considered that a downlink subframe set associated with the uplink subframe 2 include downlink subframes 4, 5, 6, and 8 in five carriers configured for the terminal device. In the codebook multiplexing mode, generation of a codebook of the ACK or the NACK that needs to be fed back in the uplink subframe 2 is determined based on the downlink subframe set associated with the uplink subframe 2. The codebook of the ACK or the NACK is a bit stream obtained after original bits of the ACK or the NACK before encoding are sorted in a specific sequence. A size of the codebook of the ACK or the NACK in this example is 20. A specific sequence may be sorting ACK or NACK bits corresponding to a subframe, and then sorting ACK or NACK bits corresponding to a carrier. That is, ACK or NACK bits corresponding to subframes 4, 5, 6, and 8 of a carrier 1 are first sorted, then ACK or NACK bits corresponding to subframes 4, 5, 6, and 8 of a carrier 2 are sorted, and ACK or NACK bits corresponding to subframes of a remaining carrier are continuously sorted in the foregoing manner. Particularly, for an unscheduled downlink subframe or for a downlink subframe in which the terminal device does not receive downlink data, NACK information needs to be filled into a corresponding ACK or NACK bit location.

For a U-LTE system, at least an ACK or a NACK corresponding to a PDSCH transmitted on a serving cell on an unlicensed spectrum can be transmitted on a current serving cell on the unlicensed spectrum or on another serving cell on the unlicensed spectrum. However, it is extremely difficult to ensure the foregoing predefined timing relationship from the PDSCH to the ACK or the NACK on the serving cell on the unlicensed spectrum. One reason is that the terminal device needs to perform LBT before sending the ACK or the NACK on the unlicensed spectrum. If a channel is not idle, the terminal device cannot send the ACK or the NACK on a predetermined uplink channel. In addition, an uplink-downlink subframe configuration on the unlicensed spectrum may be flexible. For example, burst transmission in the U-LTE system includes N consecutive downlink subframes, followed by a special subframe or followed by a GP instead of a special subframe, and then followed by M uplink subframes. N and M are flexibly selected each time the base station performs burst transmission. Consequently, a previous TDD uplink-downlink configuration timing relationship cannot be followed, that is, the timing relationship in Table 2 cannot be followed.

To resolve a timing problem during transmission of an ACK or a NACK on a serving cell on an unlicensed spectrum, an embodiment of the present invention provides a feedback information sending method. The method is applied to a terminal device. As shown in FIG. 1, the method includes the following steps.

101. The terminal device receives, in a downlink subframe in a downlink subframe set of a downlink burst, downlink data sent by an access network device.

It should be noted that in this embodiment of the present invention, the downlink subframe includes a normal downlink subframe, such as a subframe that includes 14 OFDM symbols in a normal cyclic prefix configuration in an LTE system; or may further include some special subframes, where a part used for downlink transmission in the special subframe may be less than 14 OFDM symbols. Another OFDM symbol in the special subframe may be used to transmit uplink information or may be used as a guard period. Alternatively, the part used for downlink transmission in the special subframe may be less than 14 OFDM symbols and there are no remaining OFDM symbols, that is, a length of the special subframe is less than 14 OFDM symbols.

It should be further noted that the downlink burst is generally a plurality of downlink subframes that are continuously occupied in time domain. Specifically, duration during which one sending operation of a sending node, such as the access network device (such as a base station) or the terminal device, on an unlicensed spectrum can continuously occupy a channel is limited and is usually limited by local laws and regulations. For example, maximum occupation duration varies according to a priority of a to-be-sent service. Generally, a higher service priority indicates shorter maximum occupation duration, and vice versa. For example, a service priority of an Internet telephone service is relatively high, and therefore continuous occupation can usually last for 2 milliseconds. For example, a service priority of a data transmission service such as file downloading is relatively low, and therefore continuous occupation can usually last for 8 or 10 milliseconds.

Figure 2:
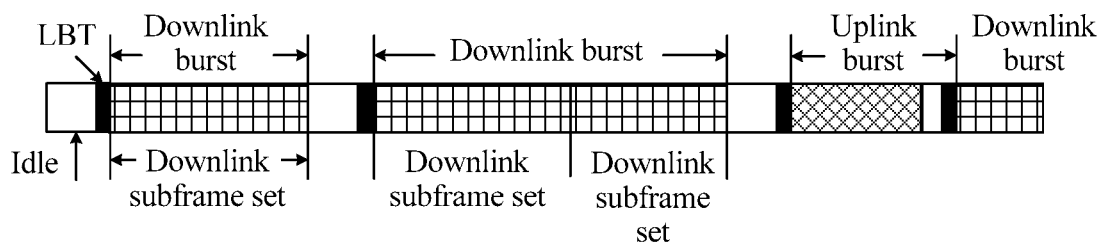
FIG. 2 is a schematic diagram of a relationship between a downlink burst, a downlink subframe set, and an uplink burst according to an embodiment of the present invention.

As shown in FIG. 2, the access network device transmits information on a carrier on the unlicensed spectrum in a burst form. For example, in this step, the downlink burst may include only one downlink subframe set or may include a plurality of downlink subframe sets. In addition, the downlink burst may be continuously followed by another downlink burst or may be followed by an uplink burst. This is not limited in the present invention.

In this step, that the terminal device receives, in a downlink subframe in a downlink subframe set of a downlink burst, downlink data sent by an access network device may specifically include the following steps.

Step 1: The terminal device detects a downlink control channel.

The terminal device may detect the downlink control channel in all downlink subframes in the downlink subframe set of the downlink burst, or may detect the downlink control channel in some downlink subframes in the downlink subframe set of the downlink burst.

Step 2: The terminal device receives the downlink data in a downlink data channel scheduled by the detected downlink control channel. The downlink data channel may also be called a physical downlink shared channel in the LTE system, and the downlink data channel or the physical downlink shared channel carries the downlink data.

The downlink control channel and the downlink data channel scheduled by the downlink control channel are generally in a same downlink subframe. Alternatively, the downlink control channel and the downlink data channel may be in different downlink subframes.

Likewise, the terminal device may receive the downlink data in all the downlink subframes in the downlink subframe set of the downlink burst, or may receive the downlink data in some downlink subframes in the downlink subframe set of the downlink burst.

It may be understood that after receiving the downlink data in the downlink data channel, the terminal device needs to feed back an ACK or a NACK corresponding to the downlink data. Downlink data in each downlink data channel is separately corresponding to one ACK or one NACK. Certainly, a plurality of pieces of downlink data separately carried in a plurality of downlink data channels may be corresponding to one ACK or one NACK. In the present invention, descriptions are provided by using an example in which the downlink data in each downlink data channel is separately corresponding to one ACK or one NACK.

102. The terminal device determines, in at least one uplink burst, a sending subframe used for sending feedback information corresponding to the downlink data. The downlink subframe set is a subset of a set consisting of a downlink subframe associated with the sending subframe, the at least one uplink burst follows the downlink burst, and each of the at least one uplink burst includes at least one uplink subframe.

Figure 3:
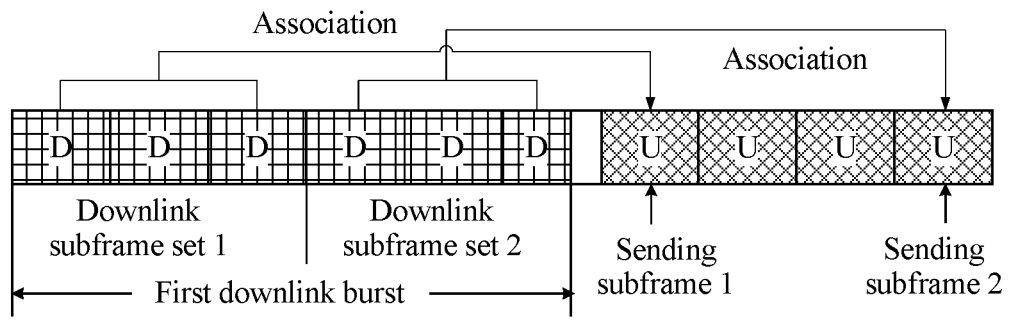
FIG. 3 is a schematic diagram of a relationship between a downlink burst, a downlink subframe set, and a sending subframe according to an embodiment of the present invention.
Figure 4:
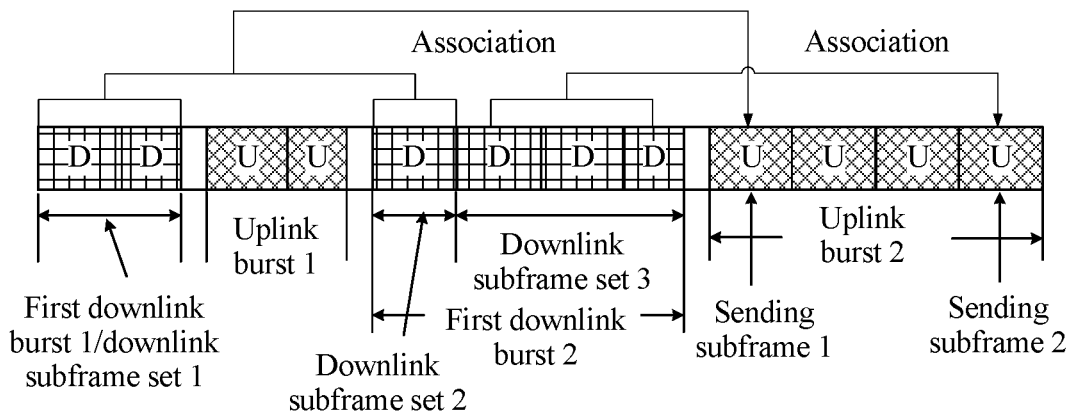
FIG. 4 is another schematic diagram of a relationship between a downlink burst, a downlink subframe set, and a sending subframe according to an embodiment of the present invention.

Considering that the sending subframe for the feedback information is in the at least one uplink burst, and the feedback information sent in the sending subframe is corresponding to the downlink data previously received in the downlink subframe set, the at least one uplink burst definitely follows the downlink burst. Specifically, as shown in FIG. 3, the uplink burst that includes the sending subframe may follow the downlink burst. Alternatively, as shown in FIG. 4, an uplink burst 2 that includes the sending subframe is an uplink burst that follows a downlink burst 2. The uplink burst 2 that includes the sending subframe does not follow a downlink burst 1, but another uplink burst and/or another downlink burst occur/occurs between the uplink burst 2 that includes the sending subframe and the downlink burst 1. These cases are not limited in the present invention.

The downlink subframe set is the subset of the set consisting of the downlink subframe associated with the sending subframe. It should be noted that the subset includes a universal set or a proper subset. Specifically, as shown in FIG. 3, a downlink subframe set 1 is the same as a set consisting of a downlink subframe associated with a sending subframe 1, and in this case, the subset is equivalent to a universal set. Likewise, a downlink subframe set 2 is the same as a set consisting of a downlink subframe associated with a sending subframe 2, and in this case, the subset is equivalent to a universal set. As shown in FIG. 4, a downlink subframe set 3 is the same as the set consisting of the downlink subframe associated with the sending subframe 2, and in this case, the subset is equivalent to a universal set. The set consisting of the downlink subframe associated with the sending subframe 1 is a union set of the downlink subframe set 1 and the downlink subframe set 2. Therefore, the downlink subframe set 1 is a proper subset of the set consisting of the downlink subframe associated with the sending subframe 1, and the downlink subframe set 2 is also a proper subset of the set consisting of the downlink subframe associated with the sending subframe 1.

In this step, association means that the feedback information corresponding to the downlink data in some or all downlink subframes in the downlink subframe set needs to be sent in the sending subframe. Optionally, such an association may be preconfigured, for example, be determined based on a preset HARQ timing relationship. The HARQ timing relationship may be that an interval between a subframe in which the downlink data is located and a subframe that sends the feedback information corresponding to the downlink data is not less than a specific threshold. In the current LTE system, the threshold is 4. That is, if the terminal device receives the downlink data in a subframe n, the terminal device may send the feedback information of the downlink data in a subframe n+4 at the earliest. Optionally, such an association may be determined by the access network device, and then a notification is sent to the terminal device, for example, the notification is sent by using common signaling or specific signaling of the terminal device.

103. The terminal device sends, in the sending subframe, the feedback information to the access network device.

Optionally, before the feedback information is sent, a resource used for sending the feedback information in the sending subframe is determined. For example, the terminal device receives higher layer signaling sent by the access network device, such as RRC (Radio Resource Control, radio resource control) signaling, and obtains a PUCCH resource set configured by the access network device for the terminal device from the RRC signaling. The PUCCH resource set includes at least one PUCCH resource. A PUCCH in the PUCCH resource set may be in a same format or may include at least two PUCCH formats. After obtaining the resource set, the terminal device receives resource indication information sent by the access network device. Finally, a physical resource used for carrying the feedback information is determined from the PUCCH resource set based on the resource indication information. It should be noted that the foregoing description is merely one resource indication manner, and another specific manner is not limited.

Figure 5:
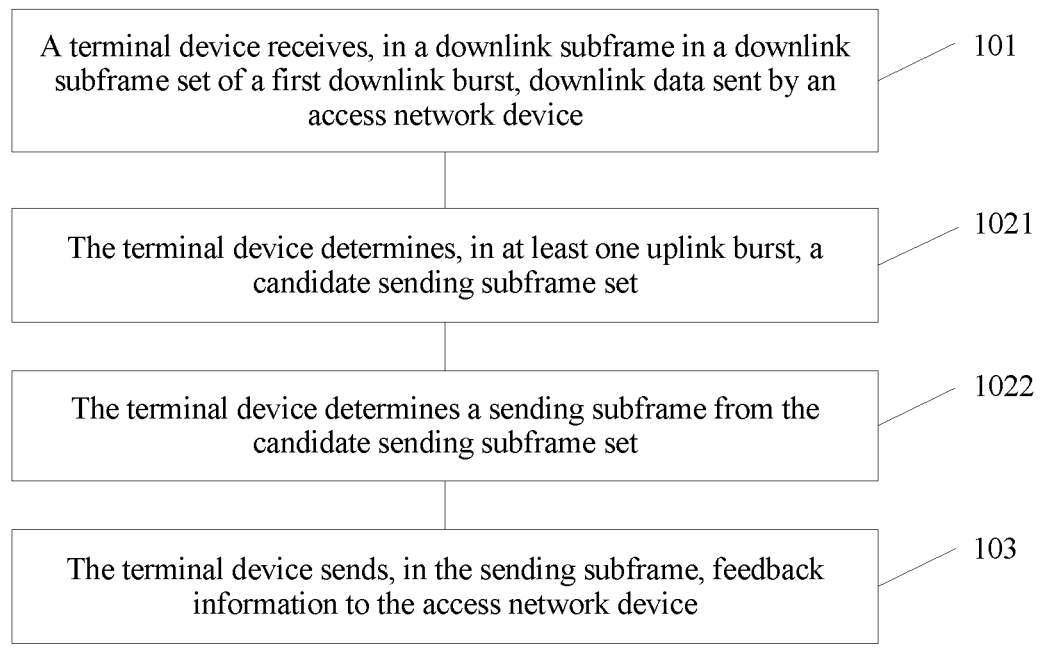
FIG. 5 is a flowchart of another feedback information sending method according to an embodiment of the present invention.

With reference to the method process shown in FIG. 1, before sending the feedback information to the access network device, the terminal device needs to determine the sending subframe for sending the feedback information. Therefore, a method in which the terminal device determines the sending subframe is described in another implementation provided in this embodiment of the present invention. As shown in FIG. 5, step 102 may be specifically implemented as steps 1021 and 1022.

1021. The terminal device determines, in the at least one uplink burst, a candidate sending subframe set, where the candidate sending subframe set includes at least one candidate sending subframe.

For example, in FIG. 3, the uplink burst following the downlink burst includes four uplink subframes. If the sending subframe is determined based on a preset rule of the HARQ timing relationship when the foregoing threshold is 4, each uplink subframe in the uplink burst can be used to send the feedback information. For example, feedback information corresponding to downlink data in three downlink subframes in the downlink subframe set 2 may be separately sent to the last three uplink subframes in the uplink burst. However, an obvious disadvantage of such an action is that resource overheads occupied by the feedback information are relatively high. Specifically, the feedback information in the current LTE system is usually transmitted in a physical uplink control channel in a sending subframe. The physical uplink control channel usually occupies one resource block in frequency domain. In this case, considering that a 20 MHz carrier includes 100 resource blocks in frequency domain, resource overheads are not high. However, sending information on the carrier on the unlicensed spectrum needs to occupy a specific proportion of frequency domain resources. For example, sending information once by the access network device or the terminal device on a carrier on an unlicensed spectrum needs to occupy at least 80% of a frequency domain resource range. For example, if the carrier includes 100 resource blocks in total, 80% of the frequency domain resource range needs to be occupied. In addition, sending information on the unlicensed spectrum is further limited by a power spectrum density. Generally, transmit power within a 1 MHz bandwidth should not exceed 10 dBm. Therefore, to improve information sending power efficiency and 80% of a frequency domain resource occupation range, a frequency domain resource occupation manner is that one physical uplink control channel occupies 10 resource blocks. Spacing between adjacent resource blocks of the 10 resource blocks in frequency domain is 10 resource blocks. In this way, resource occupation overheads of one physical uplink control channel on the unlicensed spectrum are significantly increased when compared with those in the current LTE system.

Therefore, considering resource overheads of the feedback information on the unlicensed spectrum, in a step of the present invention, the terminal device determines, in the at least one uplink burst, the candidate sending subframe set, where the candidate sending subframe set includes the at least one candidate sending subframe. Specifically, for example, in FIG. 3, only two uplink subframes of the four uplink subframes in the uplink burst are determined as candidate sending subframes. The other two uplink subframes do not include a resource of the feedback information at least for the terminal device. In this way, resource overheads of the feedback information can be reduced. For example, feedback information corresponding to the downlink subframe set 1 is sent to the sending subframe 1, and feedback information corresponding to the downlink subframe set 2 is sent to the sending subframe 2.

Optionally, the terminal device determines, in the at least one uplink burst, the candidate sending subframe set according to a signaling of the access network device.

Optionally, the signaling is common downlink control signaling, and the terminal device receives the common downlink control signaling in the penultimate and/or the last downlink subframe of the downlink burst. The common downlink control signaling is used to keep the terminal device notified, so that some uplink subframes in the uplink burst do not reserve in advance any resource of the feedback information of the terminal device. The common downlink control signaling may be control information in a common physical downlink control channel, so that a candidate sending subframe set in a subsequent uplink burst can be dynamically notified based on each downlink burst, and a solution is relatively flexible.

1022. The terminal device determines the sending subframe from the candidate sending subframe set.

With reference to the method process shown in FIG. 1 or FIG. 5, optionally, the terminal device determines the sending subframe from the candidate sending subframe set based on a hybrid automatic repeat request (HARQ) timing relationship.

Specifically, the sending subframe may be determined from the candidate sending subframe set based on a preset HARQ timing relationship. The HARQ timing relationship may be that the interval between the subframe in which the downlink data is located and the subframe that sends the feedback information corresponding to the downlink data is not less than a specific threshold. In the current LTE system, the threshold is 4. That is, if the terminal device receives the downlink data in the subframe n, the terminal device may send the feedback information of the downlink data in the subframe n+4 at the earliest. Another value of the threshold is not excluded.

Figure 6:
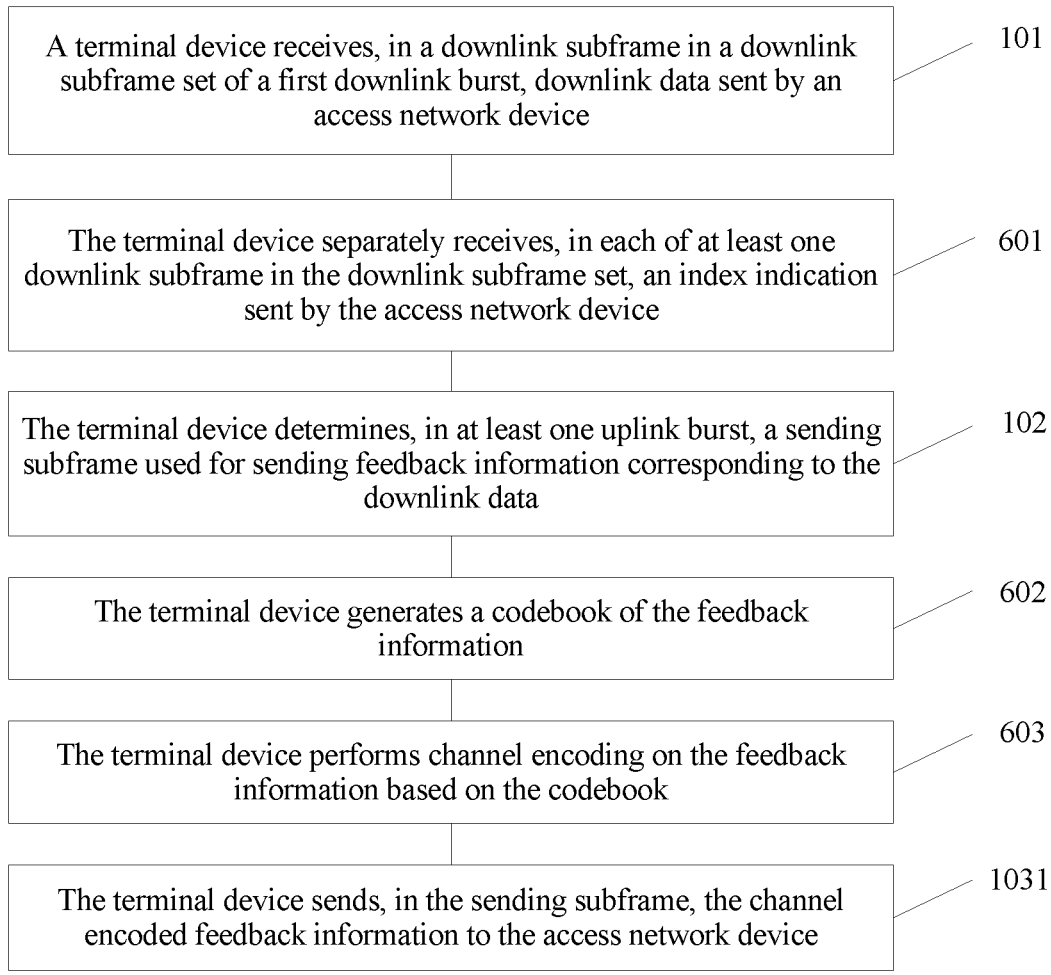
FIG. 6 is a flowchart of another feedback information sending method according to an embodiment of the present invention.

With reference to the method process shown in FIG. 1 or FIG. 5, before sending the feedback information to the access network device, the terminal device needs to receive an index indication and generate a codebook of the feedback information. Therefore, a further method is described in another implementation provided in this embodiment of the present invention. As shown in FIG. 6, in addition to the method steps shown in FIG. 1 and FIG. 5, the method includes the following steps.

601. The terminal device separately receives, in each of at least one downlink subframe in the downlink subframe set, an index indication sent by the access network device.

A value of the index indication is determined by the access network device based on any one of the following information:

a first subframe number, in the downlink burst, of a downlink subframe in which the index indication is located;

a first subframe number, in the downlink burst, that is started from a first start scheduling subframe and that is of a downlink subframe in which the index indication is located, where the first start scheduling subframe is a first subframe, of the terminal device, scheduled by the access network device in the downlink burst;

a second subframe number, in the downlink subframe set, of a downlink subframe in which the index indication is located; and a second subframe number, in the downlink subframe set, that is started from a second start scheduling subframe and that is of a downlink subframe in which the index indication is located, where the second start scheduling subframe is a first subframe, of the terminal device, scheduled by the access network device in the downlink subframe set.

602. The terminal device generates a codebook of the feedback information. Original bits of feedback information separately corresponding to at least one first downlink subframe and/or at least one second downlink subframe in the downlink subframe set are sorted in the codebook based on the value of the index indication, and the first downlink subframe and the second downlink subframe are respectively, in the downlink subframe set, a downlink subframe in which the terminal device receives the downlink data and a downlink subframe in which the terminal device does not receive the downlink data.

As mentioned in the foregoing embodiment, the access network device may separately send common downlink control signaling in the last two subframes in the downlink burst, so as to indicate an end location of the downlink burst. To determine the downlink subframe set that is of the downlink burst and that is associated with the sending subframe, for example, to determine the downlink subframe set based on the HARQ timing relationship, the terminal device further needs to determine a start subframe of the downlink burst or the first subframe, of the terminal device, scheduled in the downlink burst. In the current LTE system, the terminal device may blindly detect a reference signal such as a cell-specific reference signal in each downlink subframe, to determine a subframe from which a downlink burst starts. However, blind detection for existence of a reference signal is sometimes unreliable, for example, a probability of a false alarm is relatively high when a signal-to-noise ratio is relatively low. Consequently, the terminal device and the access network device may have inconsistent understandings for a sending subframe and a downlink subframe set associated with the sending subframe, and then have inconsistent understandings for the codebook of the feedback information, and finally the access network device incorrectly receives the feedback information. As a result, system performance is greatly decreased.

For example, the downlink burst of the access network device starts from a subframe n, but the terminal device does not detect a reference signal on the subframe n and detects a reference signal on a subframe n+1. In this case, the terminal device considers that the downlink burst starts from the subframe n+1. Consequently, a downlink subframe set associated with a sending subframe understood by the terminal device may be one subframe less than that understood by the access network device, and an understanding for the codebook of the feedback information is that one less bit is included. As a result, the access network device incorrectly receives the feedback information corresponding to the downlink data in all downlink subframes in the whole downlink subframe set.

For another example, the downlink burst of the access network device starts from a subframe n, and no downlink information is sent in a subframe n−1, but the terminal device detects a reference signal on the subframe n−1. In this case, the terminal device considers that the downlink burst starts from the subframe n−1. Consequently, a downlink subframe set associated with a sending subframe understood by the terminal device may be one subframe more than that understood by the access network device, and an understanding for the codebook of the feedback information is that one more bit is included. As a result, the access network device incorrectly receives the feedback information corresponding to the downlink data in all downlink subframes in the whole downlink subframe set.

To resolve the foregoing problem that the understanding for the codebook of the feedback information of the access network device and that of the terminal device may be inconsistent, the present invention provides a solution: The access network device separately sends an index indication to each scheduled downlink subframe of the terminal device, for example, sends the index indication to a physical downlink control channel for scheduling the downlink data, where the indication may be specifically an explicit bit indication, or may be an implicit indication, such as an implicit manner of performing scrambling on CRC by using different masks, so as to assist in ensuring consistence between an actual scheduling status of the access network device and a codebook, of feedback information, that is to be sent in a current sending subframe and that is determined by the terminal device. Specifically, there are four index indication value setting methods.

Figure 7:
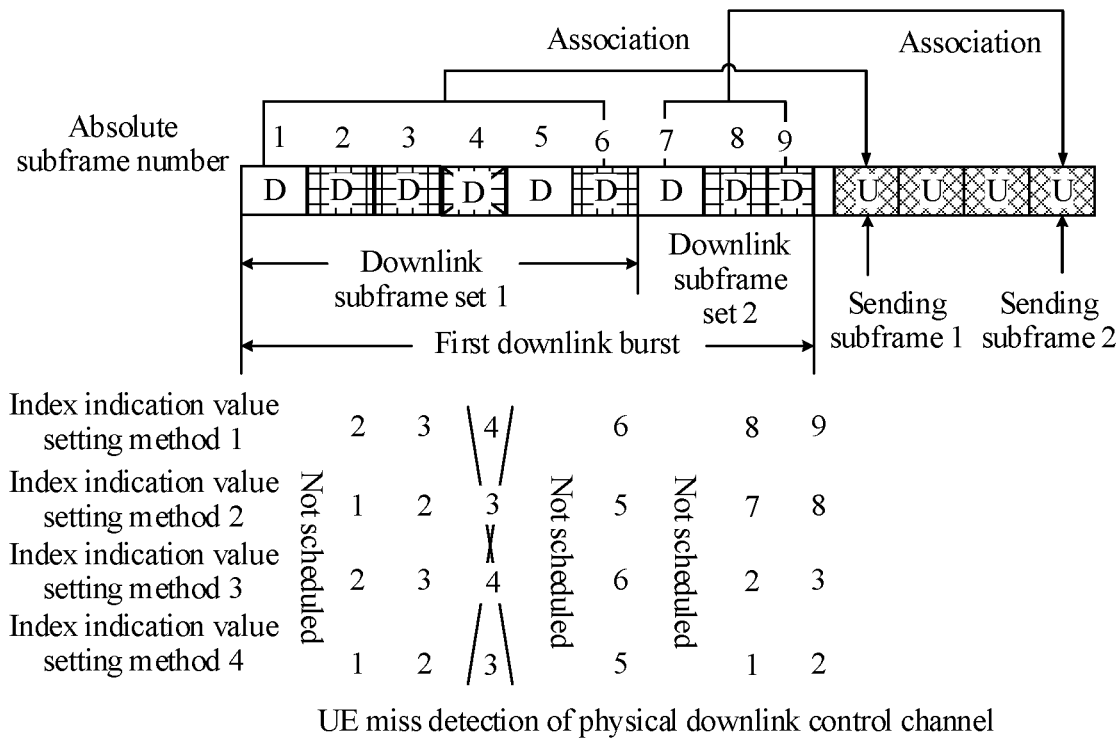
FIG. 7 is a schematic diagram of an index indication value setting method according to an embodiment of the present invention.

Before the foregoing four methods are described, an assumed condition is provided: a downlink burst, a downlink subframe set, and a scheduling status of corresponding downlink data are included. It should be noted that the assumed condition is merely a specific example. The four index indication setting methods in the present invention are not limited to the assumed condition. As shown in FIG. 7, the downlink burst starts from a subframe 1 and ends in a subframe 9. An uplink burst follows the downlink burst. The uplink burst includes four uplink subframes. Two of the four uplink subframes are candidate sending subframes for sending feedback information, that is, a sending subframe 1 and a sending subframe 2. An association between the downlink subframe set and the sending subframe determined based on the HARQ timing relationship is as follows: a downlink subframe set 1 including a downlink subframe 1 to a downlink subframe 6 is associated with the sending subframe 1, and a downlink subframe set 2 including a downlink subframe 7 to a downlink subframe 9 is associated with the sending subframe 2. The access network device performs downlink data scheduling on the terminal device in downlink subframes 2, 3, 4, 6, 8, and 9, for example, separately sends a physical downlink control channel and downlink data corresponding to the physical downlink control channel. The access network device does not perform downlink data scheduling on the terminal device in downlink subframes 1, 5, and 7. It should be noted that the terminal device receives the physical downlink control channel and the corresponding downlink data in the downlink subframes 2, 3, 6, 8, and 9, but does not receive the physical downlink control channel and the corresponding downlink data in the downlink subframe 4. That is, the terminal device encounters miss detection of the physical downlink control channel in the downlink subframe 4. Based on the foregoing assumed condition, the four index indication setting methods are described one by one below. It is assumed herein that the index indication is described by using a bit indication.

Index indication setting method 1:

The value of the index indication is determined by the access network device based on the following information: the first subframe number, in the downlink burst, of the downlink subframe in which the index indication is located.

As shown in FIG. 7, scheduled downlink subframes of the terminal device in the downlink burst are the downlink subframes 2, 3, 4, 6, 8, and 9. Therefore, the access network device separately sets corresponding values of the index indication to 2, 3, 4, 6, 8, and 9. Considering the miss detection of the physical downlink control channel on the downlink subframe 4, the values of the index indication received by the terminal device are separately 2, 3, 6, 8, and 9. Therefore, considering that the terminal device receives at least one common downlink control channel in the last two subframes of the downlink burst, that is, the downlink subframes 8 and 9, the downlink subframe 9 is the last subframe of the downlink burst. With reference to the index indication received by the terminal device, the terminal device determines that feedback information corresponding to a first, a fourth, a fifth, and a seventh subframe of the downlink burst needs to be fed back as a NACK. That is, the NACK is set in a bit location of feedback information corresponding to a downlink subframe in which the terminal device does not receive downlink scheduling signaling. Assuming that the received downlink data is corresponding to an ACK, the terminal device can generate, according to a sequence, a codebook 011001 of feedback information sent in the sending subframe 1, and the terminal device can generate, according to a sequence, a codebook 011 of feedback information sent in the sending subframe 2. 0 represents the NACK, and 1 represents the ACK.

Index indication setting method 2:

The value of the index indication is determined by the access network device based on the following information: the first subframe number, in the downlink burst, that is started from the first start scheduling subframe and that is of the downlink subframe in which the index indication is located. The first start scheduling subframe is the first subframe, of the terminal device, scheduled by the access network device in the downlink burst.

As shown in FIG. 7, scheduled downlink subframes of the terminal device in the downlink burst are the downlink subframes 2, 3, 4, 6, 8, and 9. Therefore, the access network device separately sets corresponding values of the index indication to 1, 2, 3, 5, 7, and 8. That is, the value of the index indication is set by starting counting from the first scheduled downlink subframe of the terminal device in the downlink burst. Considering the miss detection of the physical downlink control channel on the downlink subframe 4, the values of the index indication received by the terminal device are separately 1, 2, 5, 7, and 8. Therefore, considering that the terminal device receives at least one common downlink control channel in the last two subframes of the downlink burst, that is, the downlink subframes 8 and 9, the downlink subframe 9 is the last subframe of the downlink burst. With reference to the index indication received by the terminal device, the terminal device determines that a NACK is set in a bit location of feedback information corresponding to two downlink subframes, of the downlink burst, whose values of an index indication are between 2 and 5, and a NACK is set in a bit location of feedback information corresponding to a downlink subframe whose value of an index indication is between 5 and 7. That is, the NACK is set in a bit location of feedback information corresponding to a downlink subframe in which the terminal device does not receive downlink scheduling. It should be noted that the terminal device may further determine that the codebook of the feedback information starts from feedback information corresponding to a downlink subframe whose index indication is 1. The terminal device does not care about a status of a downlink subframe, in the downlink burst, before the downlink subframe whose value of the index indication is 1. Assuming that the received downlink data is corresponding to an ACK, the terminal device can generate, according to a sequence, a codebook 11001 of feedback information sent in the sending subframe 1, and the terminal device can generate, according to a sequence, a codebook 011 of feedback information sent in the sending subframe 2. 0 represents the NACK, and 1 represents the ACK. It can be learned that a size of the codebook of the feedback information sent in the sending subframe 1 is one bit less than the corresponding codebook obtained according to the foregoing method 1. Therefore, the method 2 can resolve the problem that understandings for the codebook of the terminal device and the access network device are inconsistent. In addition, compared with the method 1, the method 2 can further reduce overheads or improve feedback information transmission performance.

Index indication setting method 3:

The value of the index indication is determined by the access network device based on the following information: the second subframe number, in the downlink subframe set, of the downlink subframe in which the index indication is located.

As shown in FIG. 7, scheduled downlink subframes of the terminal device in the downlink subframe set 1 of the downlink burst are the downlink subframes 2, 3, 4, and 6, and scheduled downlink subframes of the terminal device in the downlink subframe set 2 of the downlink burst are the downlink subframes 8 and 9. Therefore, the access network device separately sets corresponding values of the index indication to 2, 3, 4, 6, 2, and 3. Considering the miss detection of the physical downlink control channel on the downlink subframe 4, the values of the index indication received by the terminal device are separately 2, 3, 6, 2, and 3. Therefore, considering that the terminal device receives at least one common downlink control channel in the last two subframes of the downlink burst, that is, the downlink subframes 8 and 9, the downlink subframe 9 is the last subframe of the downlink burst. With reference to the index indication received by the terminal device, the terminal device determines that feedback information corresponding to a first, a fourth, a fifth, and a seventh subframe of the downlink burst needs to be fed back as a NACK. That is, the NACK is set a bit location of feedback information corresponding to a downlink subframe in which the terminal device does not receive downlink scheduling. Assuming that the received downlink data is corresponding to an ACK, the terminal device can generate, according to a sequence, a codebook 011001 of feedback information sent in the sending subframe 1, and the terminal device can generate, according to a sequence, a codebook 011 of feedback information sent in the sending subframe 2. 0 represents the NACK, and 1 represents the ACK.

Index indication setting method 4:

The value of the index indication is determined by the access network device based on the following information: the second subframe number, in the downlink subframe set, that is started from the second start scheduling subframe and that is of the downlink subframe in which the index indication is located. The second start scheduling subframe is the first subframe, of the terminal device, scheduled by the access network device in the downlink subframe set.

As shown in FIG. 7, scheduled downlink subframes of the terminal device in the downlink subframe set 1 of the downlink burst are the downlink subframes 2, 3, 4, and 6, and scheduled downlink subframes of the terminal device in the downlink subframe set 2 of the downlink burst are the downlink subframes 8 and 9. Therefore, the access network device separately sets corresponding values of the index indication to 1, 2, 3, 5, 1, and 2. Considering the miss detection of the physical downlink control channel on the downlink subframe 4, the values of the index indication received by the terminal device are separately 1, 2, 5, 1, and 2. Therefore, considering that the terminal device receives at least one common downlink control channel in the last two subframes of the downlink burst, that is, the downlink subframes 8 and 9, the downlink subframe 9 is the last subframe of the downlink burst. With reference to the index indication received by the terminal device, the terminal device determines that a NACK is set in a bit location of feedback information corresponding to two downlink subframes, of the downlink burst, whose values of an index indication are between 2 and 5. That is, the NACK is set in a bit location of feedback information corresponding to a downlink subframe in which the terminal device does not receive downlink scheduling. It should be noted that the terminal device may further determine that the codebook of the feedback information starts from feedback information corresponding to a downlink subframe whose index indication is 1. The terminal device does not care about a status of a downlink subframe, in the downlink subframe set 1, before the downlink subframe whose value of the index indication is 1 and a status of a downlink subframe, in the downlink subframe set 2, before the downlink subframe whose value of the index indication is 1. Assuming that the received downlink data is corresponding to an ACK, the terminal device can generate, according to a sequence, a codebook 11001 of feedback information sent in the sending subframe 1, and the terminal device can generate, according to a sequence, a codebook 11 of feedback information sent in the sending subframe 2. 0 represents the NACK, and 1 represents the ACK. It can be learned that sizes of the codebooks of the feedback information sent in the sending subframe 1 and the sending subframe 2 are separately one bit less than the corresponding codebook obtained according to the foregoing method 1. Therefore, the method 4 can resolve the problem that understandings for the codebook of the terminal device and the access network device are inconsistent. In addition, compared with the method 1, the method 2 can further reduce overheads or improve feedback information transmission performance.

It should be noted that considering bit overheads of the index indication, generally two or three bits are used as the index indication. Certainly, another bit quantity is not excluded. An index indication of two bits is used as an example. A modulo operation may be performed so that the index indication can be used to indicate a subframe number. For example, four states of the two bits are separately '00', '01', '10', and '11', and may separately represent 1, 2, 3, and 4, or may separately represent 0, 1, 2, and 3. An expression manner of a value greater than 3 or 4 may be performing cyclic counting through a modulo operation, that is, 1, 2, 3, 4, 1 (5), 2 (6), 3 (7), 4 (8) . . . . Specifically, the value greater than 3 or 4 may be expressed by using a formula $Y=(X-1) \mod 4 + 1$. X is an actually accumulated count value, such as the foregoing 1 to 8. Y is a value obtained after cyclic modulo operations are performed, that is, is corresponding to the foregoing 1, 2, 3, 4, 1, 2, 3, 4 . . . . The value of the index indication shown in FIG. 7 is the actually accumulated count value.

It should be further noted that in the foregoing four index indication value setting methods, the first subframe number is a number value sorted from the head in the downlink burst, or a number value that is sorted from the head and that is started from the start scheduling subframe in the downlink burst. For example, in the embodiment in FIG. 7, sorting is started from 1, or sorting may be started from another value, such as 0. In addition, because the LTE system has a strict frame structure, there is an absolute subframe number. For example, a subframe in a radio frame is from 0 to 9, and then is from 0 to 9 in a next radio frame, and so on. Therefore, the first subframe number may also be an absolute subframe number in the downlink burst, namely, a subframe number associated with a frame structure. Likewise, the second subframe number may also use a similar rule. Details are not described herein.

603. The terminal device performs channel encoding on the feedback information based on the codebook.

After the terminal device determines the codebook of the feedback information, the terminal device needs to perform channel encoding based on the codebook. A channel encoding type may be linear block encoding, convolutional code, Turbo code, or the like. The channel encoding type is not limited in the present invention. If the linear block encoding such as Reed Muller code is used, CRC (Cyclic Redundancy Check, cyclic redundancy check) usually does not need to be added before encoding. If the convolutional code or the Turbo code is used, the terminal device may add a CRC bit to the codebook of the feedback information before encoding.

Step 103 in the method process shown in FIG. 1 or FIG. 5 further includes the following step 1031:

1031. The terminal device sends, in the sending subframe, the channel-encoded feedback information to the access network device.

With reference to the method shown in FIG. 6, optionally, the terminal device generates the codebook of the feedback information according to the index indication and the common downlink control signaling. The common downlink control signaling is signaling received by the terminal device from the access network device in the penultimate and/or the last downlink subframe of the downlink burst.

According to the feedback information sending method provided in this embodiment of the present invention, the feedback information can be sent on the unlicensed spectrum. In addition, resource overheads occupied by the feedback information can be further reduced by introducing a candidate sending subframe set concept. Still further, the index indication is introduced, so that understandings for the codebook of the feedback information of the access network device and the terminal device are kept consistent. System robustness is improved, and feedback information receiving performance can be further improved by decreasing the size of the codebook.

Figure 8:
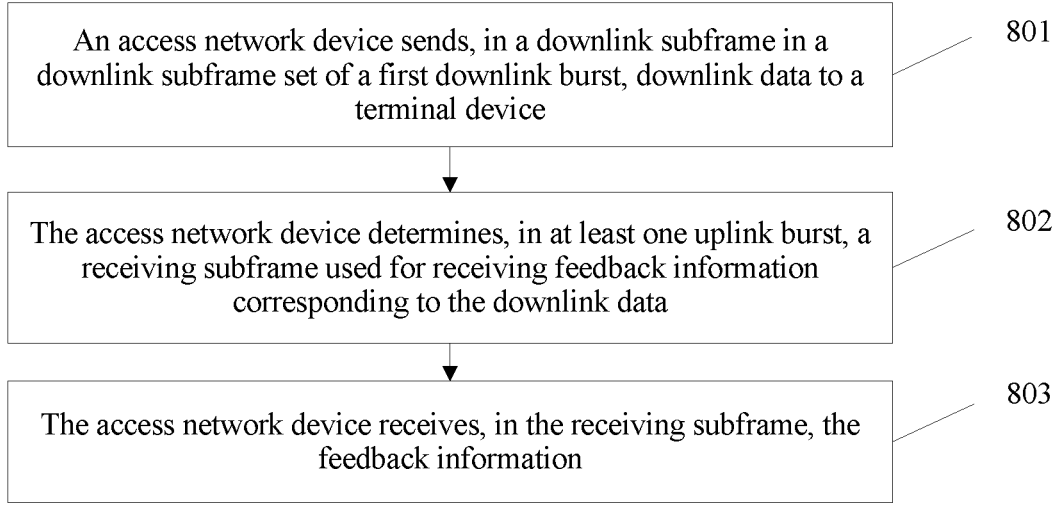
FIG. 8 is a flowchart of a feedback information receiving method according to an embodiment of the present invention.

An embodiment of the present invention further provides a feedback information receiving method. The method is applied to an access network device, and the access network device may be a base station, a radio network controller, or the like. It should be noted that in this embodiment, for content same as that in the foregoing embodiment, refer to descriptions above, and details are not described in this embodiment again. As shown in FIG. 8, the method includes the following steps.

801. The access network device sends, in a downlink subframe in a downlink subframe set of a downlink burst, downlink data to a terminal device.

802. The access network device determines, in at least one uplink burst, a receiving subframe used for receiving feedback information corresponding to the downlink data.

803. The access network device receives, in the receiving subframe, the feedback information.

Figure 9:
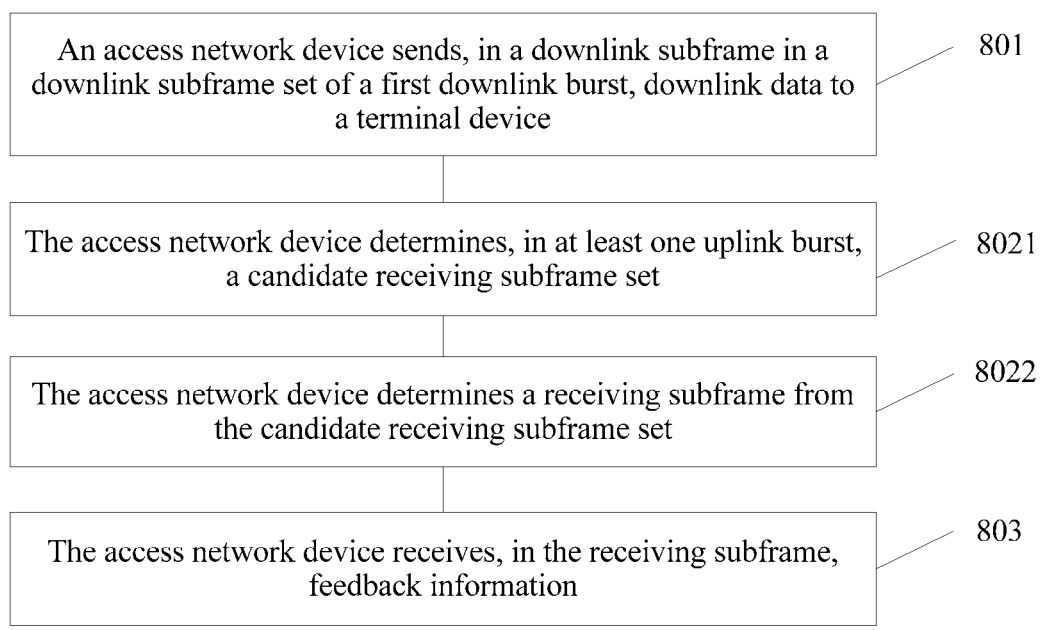
FIG. 9 is a flowchart of another feedback information receiving method according to an embodiment of the present invention.

With reference to the method process shown in FIG. 8, before receiving the feedback information, the access network device needs to determine the receiving subframe for receiving the feedback information. Therefore, a method in which the access network device determines the receiving subframe is described in another implementation provided in this embodiment of the present invention. As shown in FIG. 9, step 802 may be specifically implemented as steps 8021 and 8022.

8021. The access network device determines, in the at least one uplink burst, a candidate receiving subframe set, where the candidate receiving subframe set includes at least one candidate receiving subframe.

Optionally, the access network device notifies, by sending signaling, the terminal device of the candidate receiving subframe set.

Optionally, the signaling is common downlink control signaling, and the access network device sends the common downlink control signaling in the penultimate and/or the last downlink subframe of the downlink burst. The common downlink control signaling is used to keep the terminal device notified, so that some uplink subframes in the uplink burst do not reserve in advance any resource of the feedback information of the terminal device. The common downlink control signaling may be control information in a common physical downlink control channel, so that a candidate sending subframe set in a subsequent uplink burst can be dynamically notified based on each downlink burst, and a solution is relatively flexible.

8022. The access network device determines the receiving subframe from the candidate receiving subframe set.

With reference to the method process shown in FIG. 8 or FIG. 9, optionally, the access network device determines the receiving subframe from the candidate receiving subframe set based on a hybrid automatic repeat request (HARQ) timing relationship.

Figure 10:
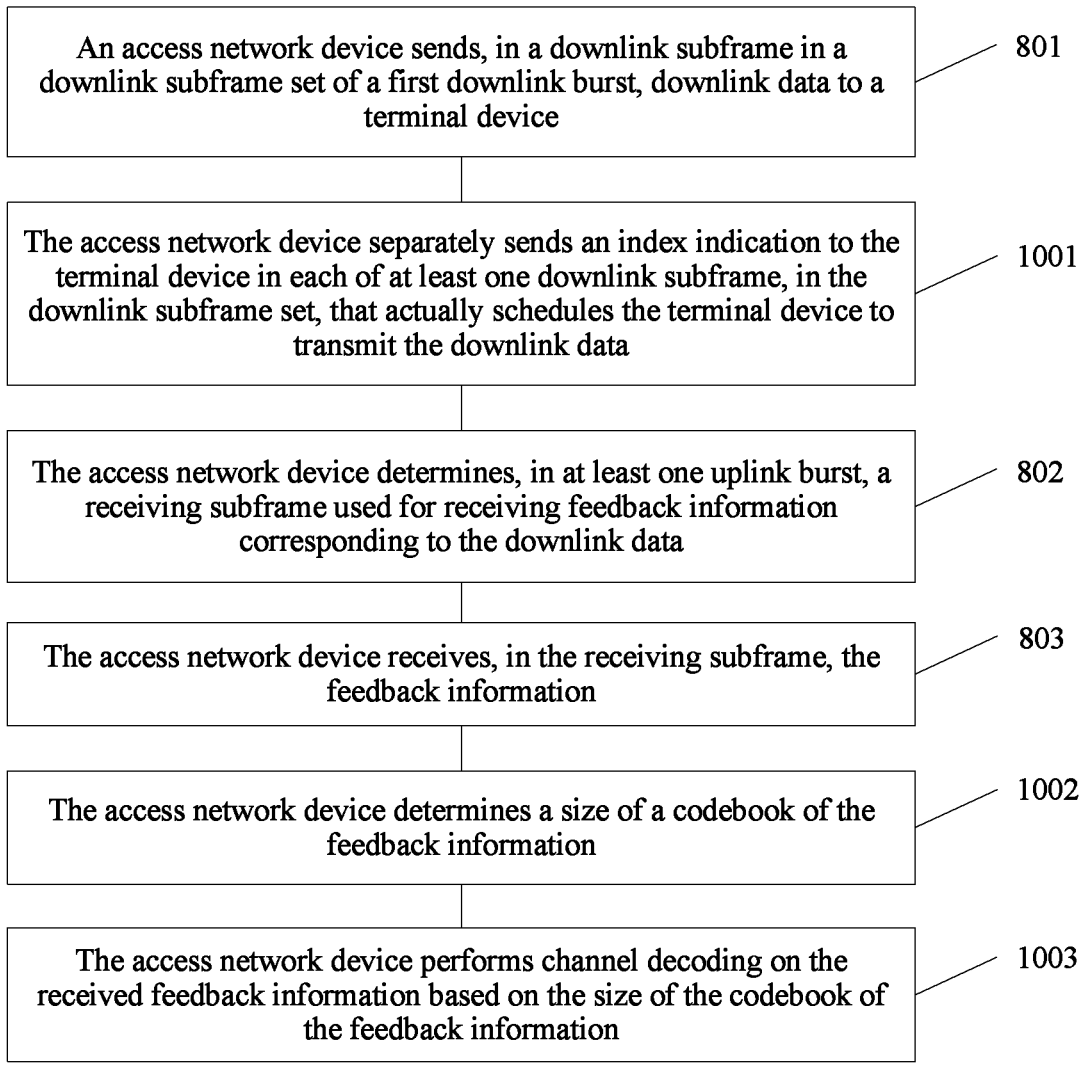
FIG. 10 is a flowchart of another feedback information receiving method according to an embodiment of the present invention.

With reference to the method process shown in FIG. 8 or FIG. 9, the access network device further needs to send an index indication to the terminal device and decode a codebook of the feedback information sent by the terminal device. Therefore, a further method is described in another implementation provided in this embodiment of the present invention. As shown in FIG. 10, in addition to the method steps shown in FIG. 8 and FIG. 9, the method includes the following steps.

1001. The access network device separately sends an index indication to the terminal device in each of at least one downlink subframe, in the downlink subframe set, that actually schedules the terminal device to transmit the downlink data.

A value of the index indication is determined by the access network device based on any one of the following information:

a first subframe number, in the downlink burst, of a downlink subframe in which the index indication is located;

a first subframe number, in the downlink burst, that is started from a first start scheduling subframe and that is of a downlink subframe in which the index indication is located, where the first start scheduling subframe is a first subframe, of the terminal device, scheduled by the access network device in the downlink burst;

a second subframe number, in the downlink subframe set, of a downlink subframe in which the index indication is located; and a second subframe number, in the downlink subframe set, that is started from a second start scheduling subframe and that is of a downlink subframe in which the index indication is located, where the second start scheduling subframe is a first subframe, of the terminal device, scheduled by the access network device in the downlink subframe set.

1002. The access network device determines a size of a codebook of the feedback information.

1003. The access network device performs channel decoding on the received feedback information based on the size of the codebook of the feedback information.

The access network device parses the codebook of the channel decoded feedback information. Original bits of feedback information separately corresponding to at least one first downlink subframe and/or at least one second downlink subframe in the downlink subframe set are sorted in the codebook based on the value of the index indication, and the first downlink subframe and the second downlink subframe are respectively, in the downlink subframe set, a downlink subframe in which the terminal device transmits the downlink data and is scheduled by the access network device and a downlink subframe in which the terminal device transmits the downlink data and is not scheduled by the access network device.

According to the feedback information receiving method provided in this embodiment of the present invention, the feedback information can be sent on an unlicensed spectrum. In addition, resource overheads occupied by the feedback information can be further reduced by introducing a candidate receiving subframe set concept. Still further, the index indication is introduced, so that understandings for the codebook of the feedback information of the access network device and the terminal device are kept consistent. System robustness is improved, and feedback information receiving performance can be further improved by decreasing the size of the codebook.

Figure 11:
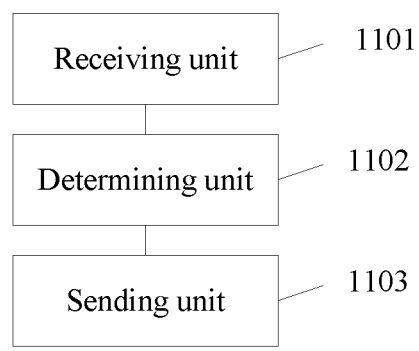
FIG. 11 is a schematic diagram of a logical structure of a terminal device according to an embodiment of the present invention.

Corresponding to the foregoing method embodiment, an embodiment of the present invention further provides a terminal device. It should be noted that this embodiment is the same as the foregoing corresponding embodiment of the sending method. For details, refer to descriptions above, and details are not described in this embodiment again. As shown in FIG. 11, the terminal device includes:

a receiving unit 1101, configured to receive, in a downlink subframe in a downlink subframe set of a downlink burst, downlink data sent by an access network device;

a determining unit 1102, configured to determine, in at least one uplink burst, a sending subframe used for sending feedback information corresponding to the downlink data received by the receiving unit, where the downlink subframe set is a subset of a set consisting of a downlink subframe associated with the sending subframe, the at least one uplink burst follows the downlink burst, and each of the at least one uplink burst includes at least one uplink subframe; and a sending unit 1103, configured to send, in the sending subframe determined by the determining unit, the feedback information to the access network device.

Optionally, the determining unit is configured to: determine, in the at least one uplink burst, a candidate sending subframe set, where the candidate sending subframe set includes at least one candidate sending subframe; and determine, the sending subframe from the candidate sending subframe set determined by the determining unit.

Optionally, the determining unit is configured to determine, in the at least one uplink burst, the candidate sending subframe set according to a signaling of the access network device.

Optionally, the signaling is common downlink control signaling, and the receiving unit is configured to receive, the common downlink control signaling in the penultimate and/or the last downlink subframe of the downlink burst.

Optionally, the determining unit is configured to determine, based on a hybrid automatic repeat request (HARQ) timing relationship, the sending subframe from the candidate sending subframe set determined by the determining unit.

In another embodiment of the present invention, before the terminal device sends, in the sending subframe, the feedback information to the access network device:

the receiving unit is further configured to separately receive, in each of at least one downlink subframe in the downlink subframe set, an index indication sent by the access network device, where a value of the index indication is determined by the access network device based on any one of the following information:

a first subframe number, in the downlink burst, of a downlink subframe in which the index indication is located;

a first subframe number, in the downlink burst, that is started from a first start scheduling subframe and that is of a downlink subframe in which the index indication is located, where the first start scheduling subframe is a first subframe, of the terminal device, scheduled by the access network device in the downlink burst;

a second subframe number, in the downlink subframe set, of a downlink subframe in which the index indication is located; and a second subframe number, in the downlink subframe set, that is started from a second start scheduling subframe and that is of a downlink subframe in which the index indication is located, where the second start scheduling subframe is a first subframe, of the terminal device, scheduled by the access network device in the downlink subframe set.

Figure 12:
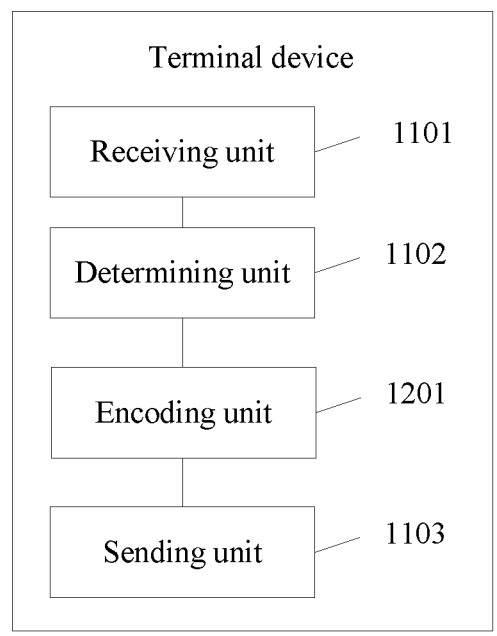
FIG. 12 is a schematic diagram of a logical structure of another terminal device according to an embodiment of the present invention.

Based on the foregoing embodiment, in still another embodiment of the present invention, as shown in FIG. 12, the terminal device further includes:

an encoding unit 1201, configured to: generate a codebook of the feedback information; and perform channel encoding on the feedback information based on the codebook generated by the encoding unit.

Original bits of feedback information separately corresponding to at least one first downlink subframe and/or at least one second downlink subframe in the downlink subframe set are sorted in the codebook based on the value of the index indication, and the first downlink subframe and the second downlink subframe are respectively, in the downlink subframe set, a downlink subframe in which the terminal device receives the downlink data and a downlink subframe in which the terminal device does not receive the downlink data.

That the terminal device sends, in the sending subframe, the feedback information to the access network device includes:

the sending unit is further configured to send to the access network device in the sending subframe, the feedback information obtained after the encoding unit performs channel encoding.

According to the terminal device provided in this embodiment of the present invention, the feedback information can be sent on an unlicensed spectrum. In addition, resource overheads occupied by the feedback information can be further reduced by introducing a candidate sending subframe set concept. Still further, the index indication is introduced, so that understandings for the codebook of the feedback information of the access network device and the terminal device are kept consistent. System robustness is improved, and feedback information receiving performance can be further improved by decreasing the size of the codebook.

Figure 13:
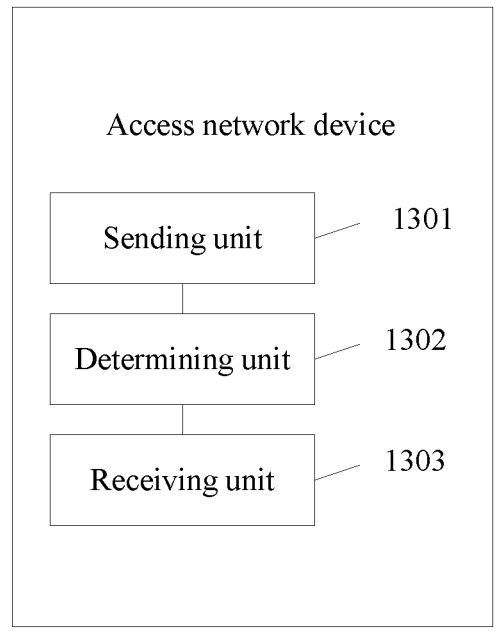
FIG. 13 is a schematic diagram of a logical structure of an access network device according to an embodiment of the present invention.

An embodiment of the present invention further provides an access network device, such as a base station or a radio network controller. It should be noted that this embodiment is the same as the foregoing corresponding embodiment of the receiving method. For details, refer to descriptions above, and details are not described in this embodiment again. As shown in FIG. 13, the access network device includes:

a sending unit 1301, configured to send in a downlink subframe in a downlink subframe set of a downlink burst, downlink data to a terminal device;

a determining unit 1302, configured to determine in at least one uplink burst, a receiving subframe used for receiving feedback information corresponding to the downlink data sent by the sending unit, where the downlink subframe set is a subset of a set consisting of a downlink subframe associated with the receiving subframe, the at least one uplink burst follows the downlink burst, and each of the at least one uplink burst includes at least one uplink subframe; and a receiving unit 1303, configured to receive in the receiving subframe determined by the determining unit, the feedback information.

Optionally, the determining unit further includes: the determining unit is configured to: determine in the at least one uplink burst, a candidate receiving subframe set, where the candidate receiving subframe set includes at least one candidate receiving subframe; and determine the receiving subframe from the candidate receiving subframe set determined by the determining unit.

Optionally, the sending unit is configured to notify by sending signaling, the terminal device of the candidate receiving subframe set determined by the determining unit.

Optionally, the signaling is common downlink control signaling, and the sending unit is configured to send the common downlink control signaling in the penultimate and/or the last downlink subframe of the downlink burst.

Optionally, the determining unit is configured to determine based on a hybrid automatic repeat request (HARQ)

timing relationship, the receiving subframe from the candidate receiving subframe set determined by the determining unit.

In another embodiment of the present invention, before the access network device receives, in the receiving subframe:

the sending unit is configured to separately send an index indication to the terminal device in each of at least one downlink subframe, in the downlink subframe set, that actually schedules the terminal device to transmit the downlink data.

A value of the index indication is determined based on any one of the following information:

a first subframe number, in the downlink burst, of a downlink subframe in which the index indication is located;

a first subframe number, in the downlink burst, that is started from a first start scheduling subframe and that is of a downlink subframe in which the index indication is located, where the first start scheduling subframe is a first subframe, of the terminal device, scheduled in the downlink burst;

a second subframe number, in the downlink subframe set, of a downlink subframe in which the index indication is located; and a second subframe number, in the downlink subframe set, that is started from a second start scheduling subframe and that is of a downlink subframe in which the index indication is located, where the second start scheduling subframe is a first subframe, of the terminal device, scheduled in the downlink subframe set.

Figure 14:
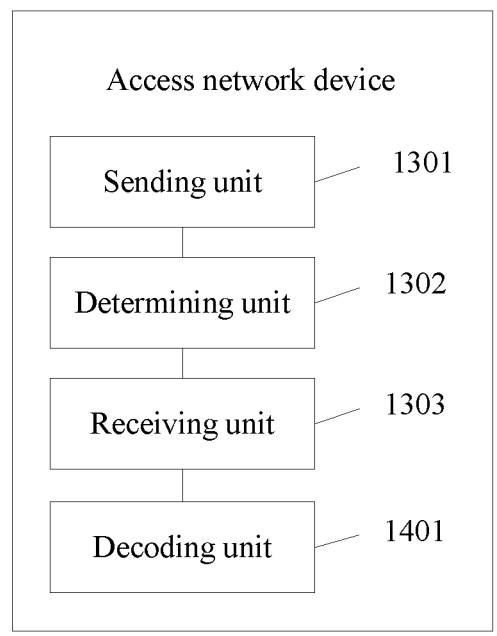
FIG. 14 is a schematic diagram of a logical structure of another access network device according to an embodiment of the present invention.

Based on the foregoing embodiment, in still another embodiment of the present invention, as shown in FIG. 14, the access network device further includes:

a decoding unit 1401, configured to perform channel decoding on the received feedback information based on the size of the codebook of the feedback information.

Optionally, the access network device may further include a parsing unit, configured to parse the codebook of the channel decoded feedback information. Original bits of feedback information separately corresponding to at least one first downlink subframe and/or at least one second downlink subframe in the downlink subframe set are sorted in the codebook based on the value of the index indication, and the first downlink subframe and the second downlink subframe are respectively, in the downlink subframe set, a downlink subframe in which the terminal device transmits the downlink data and is scheduled and a downlink subframe in which the terminal device transmits the downlink data and is not scheduled.

According to the access network device provided in this embodiment of the present invention, the feedback information can be sent on an unlicensed spectrum. In addition, resource overheads occupied by the feedback information can be further reduced by introducing a candidate receiving subframe set concept. Still further, the index indication is introduced, so that understandings for the codebook of the feedback information of the access network device and the terminal device are kept consistent. System robustness is improved, and feedback information receiving performance can be further improved by decreasing the size of the codebook.

Figure 15:
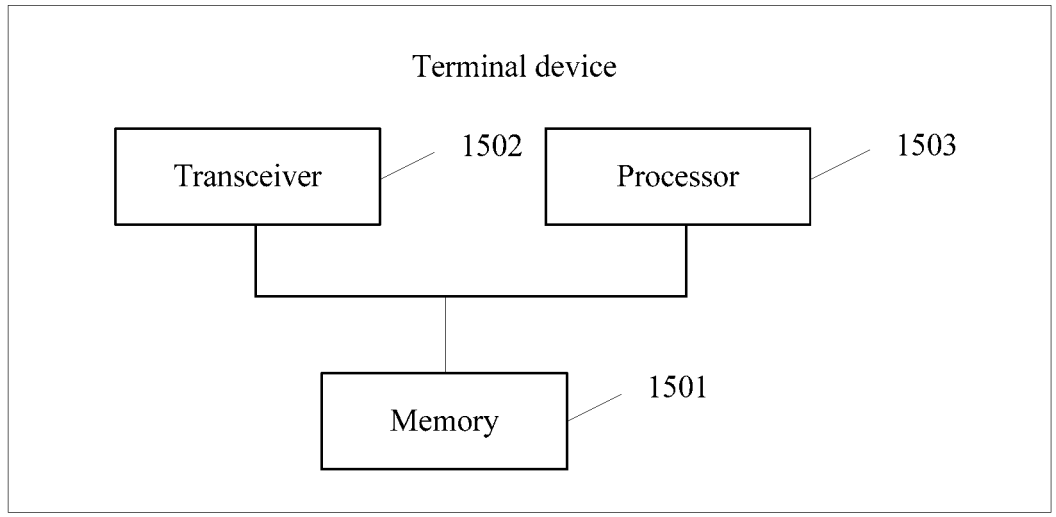
FIG. 15 is a schematic diagram of a logical structure of a terminal device in a feedback information sending method according to an embodiment of the present invention.

To improve uplink resource utilization, an embodiment of the present invention further provides a feedback information transmission apparatus. As shown in FIG. 15, FIG. 15 is a schematic diagram of a hardware structure of the terminal device described in FIG. 11 or FIG. 12. The terminal device may include a memory 1501, a transceiver 1502, and a processor 1503. The memory 1501, the transceiver 1502, and the processor 1503 are communicatively connected.

The memory 1501 may be a read-only memory (ROM), a static storage device, a dynamic storage device, or a random access memory (RAM). The memory 1501 may store an operating system and another application program. When the technical solutions provided in the embodiments of the present invention are implemented by using software or firmware, program code used to implement the technical solutions provided in the embodiments of the present invention is stored in the memory 1501, and is executed by the processor 1503.

The transceiver 1502 is used for communication between the apparatus and another device or another communications network (for example but without being limited to, an Ethernet, a radio access network (RAN), and a wireless local area network (WLAN)).

The processor 1503 may be a general-purpose central processing unit (CPU), a microprocessor, an application-specific integrated circuit (ASIC), or one or more integrated circuits, and is configured to execute a related program, so as to implement the technical solutions provided in the embodiments of the present invention.

It should be noted that the hardware shown in FIG. 15 shows only the memory 1501, the transceiver 1502, and the processor 1503. However, in a specific implementation process, a person skilled in the art should understand that the terminal further includes another device required for performing normal operations. In addition, based on a specific requirement, a person skilled in the art should understand that a hardware device for implementing another function may be further included.

Specifically, when the terminal device shown in FIG. 15 is configured to implement the apparatus in the embodiment shown in FIG. 11 or FIG. 12, the transceiver 1502 in the apparatus is configured to receive in a downlink subframe in a downlink subframe set of a first downlink burst, downlink data sent by an access network device.

The processor 1503 is coupled with the memory 1501 and the transceiver 1502, configured to control program instruction execution, and specifically configured to determine in at least one uplink burst, a sending subframe used for sending feedback information corresponding to the downlink data received by the transceiver 1502. The downlink subframe set is a subset of a set consisting of a downlink subframe associated with the sending subframe, the at least one uplink burst follows the first downlink burst, and each of the at least one uplink burst includes at least one uplink subframe.

The transceiver 1502 is further configured to send in the sending subframe determined by the processor 1503, the feedback information to the access network device.

In another embodiment of the present invention, the processor 1503 is further configured to: determine in the at least one uplink burst, a candidate sending subframe set, where the candidate sending subframe set includes at least one candidate sending subframe; determine the sending subframe from the candidate sending subframe set determined by the processor 1503; determine in the at least one uplink burst, the candidate sending subframe set according to a signaling of the access network device; and determine based on a hybrid automatic repeat request (HARQ) timing relationship, the sending subframe from the candidate sending subframe set determined by the processor 1503.

In another embodiment of the present invention, the processor 1503 is further configured to: generate a codebook of the feedback information; and perform channel encoding on the feedback information based on the codebook generated by the processor 1503.

The transceiver 1502 is further configured to separately receive in each of at least one downlink subframe in the downlink subframe set, an index indication sent.

In another embodiment, the terminal device includes a transmitter, a receiver, and a processor. The transmitter can implement a function of the receiving unit 1101 in the foregoing embodiment, the receiver can implement a function of the sending unit 1103 in the foregoing embodiment, and the processor can implement a function of the determining unit 1102 in the foregoing embodiment.

Figure 16:
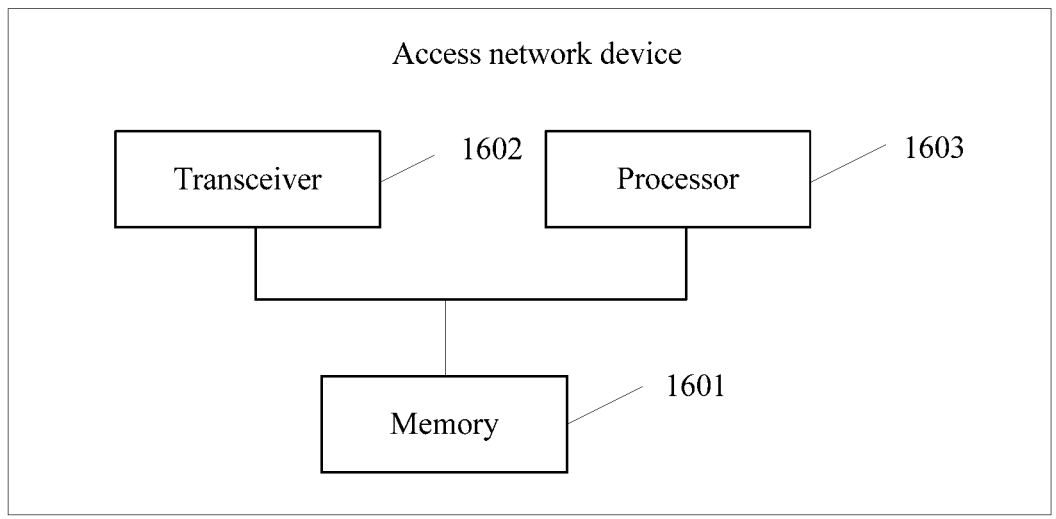
FIG. 16 is a schematic diagram of a logical structure of an access network device in a feedback information receiving method according to an embodiment of the present invention.

To improve uplink resource utilization, an embodiment of the present invention further provides a feedback information transmission apparatus. As shown in FIG. 16, FIG. 16 is a schematic diagram of a hardware structure of the access network device described in FIG. 13 or FIG. 14. The access network device may include a memory 1601, a transceiver 1602, and a processor 1603. The memory 1601, the transceiver 1602, and the processor 1603 are communicatively connected.

The transceiver 1602 is used for communication between the apparatus and another device or another communications network.

The processor 1603 may be a general-purpose central processing unit (CPU), a microprocessor, an application-specific integrated circuit (ASIC), or one or more integrated circuits, and is configured to execute a related program, so as to implement the technical solutions provided in the embodiments of the present invention.

It should be noted that the hardware shown in FIG. 16 shows only the memory 1601, the transceiver 1602, and the processor 1603. However, in a specific implementation process, a person skilled in the art should understand that the terminal further includes another device required for performing normal operations. In addition, based on a specific requirement, a person skilled in the art should understand that a hardware device for implementing another function may be further included.

Specifically, when the access network device shown in FIG. 16 is configured to implement the apparatus in the embodiment shown in FIG. 13 or FIG. 14, the transceiver 1602 in the apparatus is configured to: send in a downlink subframe in a downlink subframe set of a first downlink burst, downlink data to a terminal device; receive in a receiving subframe determined by the processor 1603, a feedback information; notify by sending signaling, the terminal device of a candidate receiving subframe set determined by the processor 1603.

In another embodiment of the present invention, the processor 1603 is coupled with the memory 1601 and the transceiver 1602, configured to control program instruction execution, and specifically configured to determine in at least one uplink burst, the receiving subframe used for receiving the feedback information corresponding to the downlink data sent by the transceiver 1602. The downlink subframe set is a subset of a set consisting of a downlink subframe associated with the receiving subframe, the at least one uplink burst follows the first downlink burst, and each of the at least one uplink burst includes at least one uplink subframe.

In another embodiment of the present invention, the processor 1603 is further configured to: determine in the at least one uplink burst, the candidate receiving subframe set, where the candidate receiving subframe set includes at least one candidate receiving subframe; determine the receiving subframe from the candidate receiving subframe set determined by the processor 1603; determine based on a hybrid automatic repeat request (HARQ) timing relationship, the receiving subframe from the candidate receiving subframe set determined by the processor 1603; determine a size of a codebook of the feedback information; perform channel decoding on the received feedback information based on the size of the codebook of the feedback information; and parse the codebook of the channel decoded feedback information.

In another embodiment of the present invention, the transceiver 1602 is further configured to separately send an index indication to the terminal device in each of at least one downlink subframe, in the downlink subframe set, that actually schedules the terminal device to transmit the downlink data.

In another embodiment, the access network device includes a transmitter, a receiver, and a processor. The transmitter can implement a function of the receiving unit 1303 in the foregoing embodiment, the receiver can implement a function of the sending unit 1301 in the foregoing embodiment, and the processor can implement a function of the determining unit 1302 in the foregoing embodiment.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A feedback information sending method, comprising:
receiving, by a terminal device in a downlink subframe in a downlink subframe set of a downlink burst, downlink data sent by an access network device;
determining, by the terminal device in at least one uplink burst, a sending subframe used for sending feedback information corresponding to the downlink data, wherein the downlink subframe set is a subset of a set consisting of a downlink subframe associated with the sending subframe, the at least one uplink burst follows the downlink burst, and each of the at least one uplink burst comprises at least one uplink subframe; and
sending, by the terminal device in the sending subframe, the feedback information to the access network device,
wherein the determining, by the terminal device in the at least one uplink burst, the sending subframe used for sending the feedback information corresponding to the downlink data comprises:
determining, by the terminal device in the at least one uplink burst, a candidate sending subframe set, wherein the candidate sending subframe set comprises at least one candidate sending subframe; and
determining, by the terminal device, the sending subframe from the candidate sending subframe set,
wherein the determining, by the terminal device in the at least one uplink burst, the candidate sending subframe set comprises:
determining, by the terminal device in the at least one uplink burst, the candidate sending subframe set according to a signaling of the access network device, and
wherein the signaling is common downlink control signaling, and the terminal device receives the common downlink control signaling in at least one of a penultimate or a last downlink subframe of the downlink burst.

2. The method according to claim 1, wherein the determining, by the terminal device, the sending subframe from the candidate sending subframe set comprises:
determining, by the terminal device, the sending subframe from the candidate sending subframe set based on a hybrid automatic repeat request (HARQ) timing relationship.

3. The method according to claim 1, wherein before the sending, by the terminal device in the sending subframe, the feedback information to the access network device, further comprising:
separately receiving, by the terminal device in each of at least one downlink subframe in the downlink subframe set, an index indication sent by the access network device, wherein a value of the index indication is determined based on any one of the following information:
a first subframe number, in the downlink burst, of a downlink subframe in which the index indication is located;
a first subframe number, in the downlink burst, that is started from a first start scheduling subframe and that is of a downlink subframe in which the index indication is located, wherein the first start scheduling subframe is a first subframe, of the terminal device, scheduled by the access network device in the downlink burst;
a second subframe number, in the downlink subframe set, of a downlink subframe in which the index indication is located; and
a second subframe number, in the downlink subframe set, that is started from a second start scheduling subframe and that is of a downlink subframe in which the index indication is located, wherein the second start scheduling subframe is a first subframe, of the terminal device, scheduled by the access network device in the downlink subframe set.

4. The method according to claim 3, further comprising:
generating, by the terminal device, a codebook of the feedback information, wherein original bits of feedback information separately corresponding to at least one of at least one first downlink subframe or at least one second downlink subframe in the downlink subframe set are sorted in the codebook based on the value of the index indication, and the first downlink subframe and the second downlink subframe are respectively, in the downlink subframe set, a downlink subframe in which the terminal device receives the downlink data and a downlink subframe in which the terminal device does not receive the downlink data; and
performing, by the terminal device, channel encoding on the feedback information based on the codebook,
wherein the sending, by the terminal device in the sending subframe, the feedback information to the access network device comprises:
sending, by the terminal device in the sending subframe, the channel-encoded feedback information to the access network device.

5. A terminal device, comprising:
a receiver configured to receive in a downlink subframe in a downlink subframe set of a downlink burst, downlink data sent by an access network device;
a processor configured to determine in at least one uplink burst, a sending subframe used for sending feedback information corresponding to the downlink data received by the receiver, wherein the downlink subframe set is a subset of a set consisting of the downlink subframe associated with the sending subframe, the at least one uplink burst follows the downlink burst, and each of the at least one uplink burst comprises at least one uplink subframe; and
a transmitter configured to send in the sending subframe determined by the determining unit, the feedback information to the access network device,
wherein the determining in the at least one uplink burst, the sending subframe used for sending the feedback information corresponding to the downlink data comprises:

the processor being configured to:
　　determine in the at least one uplink burst, a candidate sending subframe set, wherein the candidate sending subframe set comprises at least one candidate sending subframe; and
　　determine the sending subframe from the candidate sending subframe set determined by the processor,
　　wherein the determining in the at least one uplink burst, the candidate sending subframe set comprises:
　　　the processor being configured to determine in the at least one uplink burst, the candidate sending subframe set according to a signaling of the access network device, and
　　wherein the signaling is common downlink control signaling, and the receiver is configured to receive the common downlink control signaling in at least one of a penultimate or a last downlink subframe of the downlink burst.

6. The terminal device according to claim 5, wherein the determining the sending subframe from the candidate sending subframe set comprises:
　　is the processor being configured to determine based on a hybrid automatic repeat request (HARQ) timing relationship, the sending subframe from the candidate sending subframe set determined by the processor.

7. The terminal device according to claim 5, wherein before the sending in the sending subframe, the feedback information to the access network device:
　　the receiver is further configured to separately receive in each of at least one downlink subframe in the downlink subframe set, an index indication sent by the access network device, wherein a value of the index indication is determined based on any one of the following information:
　　　a first subframe number, in the downlink burst, of the downlink subframe in which the index indication is located;
　　　a first subframe number, in the downlink burst, that is started from a first start scheduling subframe and that is of the downlink subframe in which the index indication is located, wherein the first start scheduling subframe is a first subframe, of the terminal device, scheduled by the access network device in the downlink burst;
　　　a second subframe number, in the downlink subframe set, of the downlink subframe in which the index indication is located; and
　　　a second subframe number, in the downlink subframe set, that is started from a second start scheduling subframe and that is of the downlink subframe in which the index indication is located, wherein the second start scheduling subframe is a first subframe, of the terminal device, scheduled by the access network device in the downlink subframe set.

8. The terminal device according to claim 7, wherein the terminal device further comprises:
　　an encoder, configured to generate a codebook of the feedback information, wherein original bits of feedback information separately corresponding to at least one of at least one first downlink subframe or at least one second downlink subframe in the downlink subframe set are sorted in the codebook based on the value of the index indication, and the first downlink subframe and the second downlink subframe are respectively, in the downlink subframe set, a downlink subframe in which the terminal device receives the downlink data and a downlink subframe in which the terminal device does not receive the downlink data, wherein:
　　the encoder is configured to perform channel encoding on the feedback information based on the codebook generated by the encoder; and
　　the sending in the sending subframe comprises:
　　　the transmitter being configured to send to the access network device in the sending subframe, the feedback information obtained after the encoder performs channel encoding.

9. An access network device, comprising:
　　a transmitter configured to send in a downlink subframe in a downlink subframe set of a downlink burst, downlink data to a terminal device;
　　a processor configured to determine in at least one uplink burst, a receiving subframe used for receiving feedback information corresponding to the downlink data sent by the transmitter, wherein the downlink subframe set is a subset of a set consisting of a downlink subframe associated with the receiving subframe, the at least one uplink burst follows the downlink burst, and each of the at least one uplink burst comprises at least one uplink subframe; and
　　a receiver configured to receive in the receiving subframe determined by the processor, the feedback information,
　　wherein the determining in the at least one uplink burst, the receiving subframe used for receiving the feedback information corresponding to the downlink data comprises:
　　the processor being configured to:
　　　determine in the at least one uplink burst, a candidate receiving subframe set, wherein the candidate receiving subframe set comprises at least one candidate receiving subframe; and
　　　determine the receiving subframe from the candidate receiving subframe set determined by the processor.

10. The access network device according to claim 9, wherein after the determining in the at least one uplink burst, the candidate receiving subframe set,
　　is the transmitter is configured to notify by sending signaling, the terminal device of the candidate receiving subframe set determined by the processor.

11. The access network device according to claim 10, wherein the signaling is common downlink control signaling, and the transmitter is configured to send the common downlink control signaling in at least one of a penultimate or a last downlink subframe of the downlink burst.

12. The access network device according to claim 9, wherein the determining the receiving subframe from the candidate receiving subframe set comprises:
　　the processor being configured to determine based on a hybrid automatic repeat request (HARQ) timing relationship, the receiving subframe from the candidate receiving subframe set determined by the processor.

13. The access network device according to claim 9, wherein before the receiving in the receiving subframe, the feedback information:
　　the transmitter is configured to separately send an index indication to the terminal device in each of at least one downlink subframe, in the downlink subframe set, that actually schedules the terminal device to transmit the downlink data, wherein a value of the index indication is determined based on any one of the following information:
　　　a first subframe number, in the downlink burst, of a downlink subframe in which the index indication is located;

a first subframe number, in the downlink burst, that is started from a first start scheduling subframe and that is of a downlink subframe in which the index indication is located, wherein the first start scheduling subframe is a first subframe, of the terminal device, scheduled in the downlink burst;

a second subframe number, in the downlink subframe set, of a downlink subframe in which the index indication is located; and a second subframe number, in the downlink subframe set, that is started from a second start scheduling subframe and that is of a downlink subframe in which the index indication is located, wherein the second start scheduling subframe is a first subframe, of the terminal device, scheduled in the downlink subframe set.

* * * * *